United States Patent [19]
Okado

[11] Patent Number: 5,493,485
[45] Date of Patent: Feb. 20, 1996

[54] PROTECTION DEVICE FOR STOPPING OPERATION OF AN INVERTER

[75] Inventor: Chihiro Okado, Tokyo, Japan

[73] Assignee: Kabushiki Kaisha Toshiba, Kawasaki, Japan

[21] Appl. No.: 80,790

[22] Filed: Jun. 24, 1993

[30] Foreign Application Priority Data

| Jun. 24, 1992 | [JP] | Japan | 4-165997 |
| Feb. 12, 1993 | [JP] | Japan | 5-023894 |
| Apr. 22, 1993 | [JP] | Japan | 5-096199 |
| May 7, 1993 | [JP] | Japan | 5-106308 |

[51] Int. Cl.⁶ ............................. H02H 7/122
[52] U.S. Cl. ............................................. 363/56
[58] Field of Search ........................ 363/50, 55, 56, 363/74, 76, 78, 79

[56] References Cited

U.S. PATENT DOCUMENTS

| 4,208,691 | 6/1980 | Rogowsky | 363/50 X |
| 5,175,676 | 12/1992 | Kikuchi | 363/56 X |

FOREIGN PATENT DOCUMENTS 63-80720  4/1988  Japan.

OTHER PUBLICATIONS

National Congress of the Institute of Electrical Engineers of Japan, No. 1685, Apr. 1993, K. Rikiku, et al., "Development Of System Interconnection Protection Apparatus For A Photovaoltaic Generation System".

National Congress of the Institute of Electrical Engineers of Japan, No. 1519, 1990, K. Komatsugi, et al., "Reverse Charging Prevention Apparatus For Dispersed Power System".

National Congress of the Institute of Electrical Engineers of Japan, No. 1684, Apr. 1993, K. Takigawa, et al., "Trial Production Of System Interconnection Protection Apparatus For A Small-Sized Photovaoltaic Generation System".

Transactions of the Institute of Electrical Engineers of Japan, Thesis B, vol. 108-B, No. 1, 1988, pp. 45–52, K. Tsukamoto, et al., "Control And Protection On Dispersed Photovoltaic Power Systems Integrated Into A Low Voltage Distribution Feeder".

Proceedings of the Seventh Power Systems Computation Conference, Jul. 12–17, 1981, pp. 1209–1214, V. A. Bogdanov, et al., "Power System State Estimation In Hierarchical Control Structure".

IEEE Power Engineering Society, Text of "A" Papers from the Winter Meeting, Feb. 4–9, 1979, pp. 1–6, O. Mansour, et al., "Systematic Determination Of Power System Network Topology".

*Primary Examiner*—Steven L. Stephan
*Assistant Examiner*—E. To
*Attorney, Agent, or Firm*—Oblon, Spivak, McClelland, Maier & Neustadt

[57] ABSTRACT

A protection device for an inverter which is connected to an AC power system, converts DC power into AC power, supplies the AC power to a load and includes a control circuit for detecting a phase and a frequency of an output voltage, for generating a current reference synchronized with the output voltage and for controlling the inverter such that an output current is coincident with the current reference. The protection device includes a first detection circuit for detecting that an AC output is disconnected from the AC power system based on an electrical quantity of the output voltage and for generating a detection signal based on a detection result, and a correction circuit connected to receive the detection signal for generating a correction signal to break a power balance between an output power and a power consumed by the load. The control circuit corrects the current reference by the correction signal and controls the inverter based on the current reference thus corrected thereby to break the power balance. The protection device also includes a second detection circuit for detecting that the power balance is broken and for generating an abnormality signal to stop operation of the inverter based on a detection result.

13 Claims, 24 Drawing Sheets

OTHER PUBLICATIONS

Proceedings of the 1990 IEEE Colloquium in South America, Aug. 31–Sep. 15, 1990, pp. 168–172, O. Moya, "Energy Management Systems (EMS): Use In Emergency Conditions".

Conference Record of the Nineteenth IEEE Photovoltaic Specialists Conference, May 4–8, 1987, pp. 1134–1138, John Stevens, "Utility Intertied Photovoltaic System Islanding Experiments".

EPE Firenze 1991, 4th European Conference on Power Electronics and Applications, Sep. 3–6, 1991, vol. 4, pp. 40–45, S. Nonaka, et al., "Utility Interactive Photovoltaic Generation System Using A Single Phase IGBT PWM Current Source Inverter".

IEEE Transactions on Energy Conversion, vol. 4, No. 2, Jun. 1989, pp. 177–183, G. Vachtsevanos, et al., "Simulation Studies Of Islanded Behavior Of Grid–Connected Photovoltaic Systems".

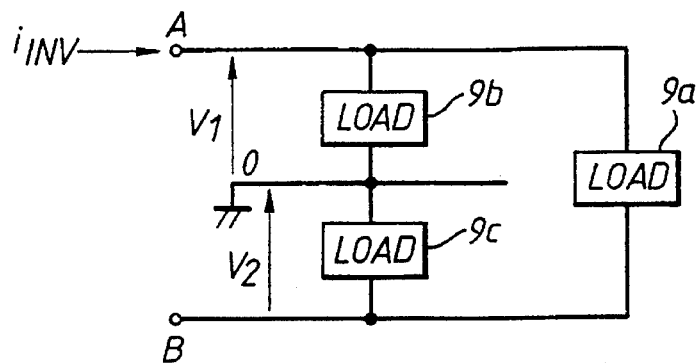
FIG. 21
FIG. 22A  FIG. 22B  FIG. 22C  FIG. 22D
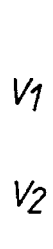 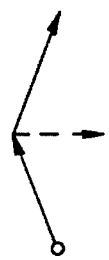  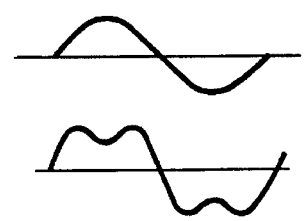
$V_1 - V_2$ 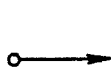  

$V1 - 2V2 = k$

PROTECTION DEVICE FOR STOPPING OPERATION OF AN INVERTER

BACKGROUND OF THE INVENTION

1. Field of the Invention

The present invention relates to a protection device for an inverter in which DC power is converted to AC power and supplied to a load and operation is effected with connection to an AC power system.

2. Description of the Related Art

A typical example of a conventional inverter protection device is shown in FIG. 24 and will now be described.

The DC power of a DC power source 1 constituted by a solar battery or a fuel battery, etc. is converted to AC power by an inverter 2 of the PWM (pulse width modulation) controlled type. The AC power has its high-frequency components removed as a result of PWM control by a filter constituted by a reactor 3 and a capacitor 4 and is supplied to a load 9.

The load 9 is also supplied with AC power for general domestic use that is supplied from an AC power system 8 via a circuit breaker 7 and a pole-mounted transformer 6, and operation is effected with the AC power of the inverter 2 interconnected to the AC power system 8. The AC voltage supplied to the load 9 is detected by a voltage detector 10, and a sine wave signal Vs is input into a current reference circuit 12 via a bandpass filter 16. The current reference circuit 12 multiplies the sine wave signal Vs and a control signal Vc output by an amplifier 11 and outputs a current reference I*. The current reference I* and an output current I of the inverter 2 that is detected by a current detector 5 are input into an amplifier 13 and PWM control of the inverter 2 such as to make the current deviation zero is effected via a PWM control section 14 and a drive section 15.

The phase of the current reference I* is approximately coincident with the phase of the AC voltage supplied to the load 9 and high power factor AC power is supplied from the inverter 2.

When a solar battery is used as the DC power source 1, a voltage reference V* is set so as to take out maximum power. The amplifier 11 generates the control signal Vc to the current reference circuit 12 so that an output voltage V of the DC power source 1 is coincident with the voltage reference V*.

But a detailed description of this will be omitted, since it is not directly related to the present invention.

In the above-described distribution system, maintenance and inspection of the load side including the pole-mounted transformer 6 are effected with separation from the AC power system 8 by opening the circuit breaker 7. In this case, the state on the load side is monitored by a voltage relay 17 and a frequency relay 18, and when separation from the AC power system 8 is effected, this is detected by an abnormality detection circuit 19 and operation of the drive section 15 is halted so as to stop operation of the inverter 2.

However, there are situation in which, if the power supplied by the inverter 2 and the power of the load 9 are balanced at the time when separation from the AC power system 8 is effected by opening the circuit breaker 7, the abnormality detection circuit 19 fails to detect an abnormality and the inverter 2 continues functioning. This state is called islanding or reverse charging and is one that is dangerous during maintenance and inspection work.

In particular, if an induction motor is connected as the load 9, there is a tendency for the voltage and frequency of the AC power system 8 to be liable to be maintained by the counter-electromotive voltage of this motor and so it is difficult to detect the islanding.

A frequency fluctuation system, a bandpass filter system, a power fluctuation system and a higher harmonic voltage monitoring system as noted below have been proposed for the prevention of the islanding, and these systems will now be described.

<Frequency fluctuation system>

A phase shift of a fixed low frequency is applied by means of a fluctuation circuit 21 to the phase of the system reference voltage input to the current reference circuit 12. Islanding is detected from the fluctuation of the inverter output frequency that takes place when the circuit breaker 7 is opened. However, with this system, if the inverter power (including reactive power) and the load power are perfectly balanced, the frequency and voltage will be unchanged, with the result is that detection of islanding will not be successful.

<Bandpass filter system>

Because of the characteristic of the bandpass filter 16, the magnitude and phase of the current reference I* of FIG. 24 are as shown in FIG. 25. At times of islanding, if the reactive power supplied by the inverter 2 and the reactive power required by the load 9 are not the same, the frequency of the AC voltage supplied to the load 9 shifts from the rated frequency $f_0$, the value of the current falls, the effective power balance is lost, the AC voltage falls, the voltage relay 17 detects an abnormality and the inverter 2 is stopped.

The case where the load impedance consists of a resistor R and a reactor L as shown in FIG. 26(a) and has a lagging power factor angle φ shown in FIG. 26(b) will now be considered. In a situation in which the inverter 2 is connected to an AC power system with a large power capacity, it operates at the rated frequency $f_0$ and so, because of the bandpass filter characteristic of FIG. 25, the inverter 2 outputs power with a power factor of 1.

When the circuit breaker 7 is opened, in order that the output power of the inverter 2 balances with the power required by the load 9, the frequency of the output voltage of the inverter 2 rises because of the lagging power factor angle φ of the load 9. When it rises to as far as a frequency $f_1$, the inverter 2 supplies power whose phase lags by the lagging power factor angle φ, because of the characteristic of the bandpass filter 16. That is, the inverter 2 functions to lower its output frequency. In this case, the value of the current only falls slightly from $I_0$ to $I_1$ and the fluctuation of the voltage is not large. This voltage fluctuation is determined by the supplied active power and the active power consumed by the load 9.

However, if the bandpass filter 16 is not present, since the inverter 2 functions in a manner such that there is always a flow of current with a power factor of 1, at the point where a balance is established in the case of FIG. 26(a) the frequency will be infinitely great. (it does not actually become infinitely great, since there is control delay, etc., but it becomes an extremely high frequency).

Thus, the bandpass filter 16 acts to suppress system frequency fluctuation at the time of islanding. In the case of a leading power factor load, the inverter 2 functions to rise its output frequency and the bandpass filter 16 acts to suppress lowering the frequency. Since at the time of islanding, the action of the bandpass filter 16 is directed towards an increase of voltage fluctuation but is directed towards suppression of frequency fluctuation, depending on conditions, detection of islanding may be delayed.

3

<Power fluctuation system>

The fluctuation circuit 21 in FIG. 24 causes the current reference I* output from the current reference circuit 12 to fluctuate at a low frequency within a set range. And when the circuit breaker 7 is opened, the balance between the power (reactive power and active power) output by the inverter 2 and the load power breaks down and consequently voltage and frequency fluctuation is caused and islanding is detected. However, even with this system, if a large number of inverters 2 are connected in parallel, there are cases in which the phases of the power fluctuation of the various inverters 2 are different from one another and consequently the state is one in which overall there is no power fluctuation and detection is not possible.

<Higher harmonic voltage monitoring system>

Voltage harmonics on the load side are monitored by a higher harmonic detection circuit 20, and when the circuit breaker 7 is opened, islanding is detected through the fact that there is an increase in higher harmonics (3rd, 5th and 7th harmonics). With this system, however, if a large number of loads 9 are used which have capacitor input type rectification circuits as in inverter air conditioning or television equipment, etc., there is a considerable fall in the reliability of detection, since there is an increase in 3rd, 5th and 7th harmonics at normal times.

SUMMARY OF THE INVENTION

Accordingly, one object of this invention is to provide an inverter protection device which can detect islanding with good reliability.

These and other objects of this invention can be achieved by providing a protection device for an inverter which is connected to an AC power system, converts DC power into AC power, supplies the AC power to a load and includes a control circuit for detecting a phase and a frequency of an output voltage, for generating a current reference synchronized with the output voltage and for controlling the inverter such that an output current is coincident with the current reference. The protection device includes a first detection circuit for detecting that an AC output is disconnected from the AC power system based on an electrical quantity of the output voltage and for generating a detection signal based on a detection result, and a correction circuit connected to receive the detection signal for generating a correction signal to break a power balance between an output power and a power consumed by the load. The control circuit corrects the current reference by the correction signal and controls the inverter based on the current reference thus corrected thereby to break the power balance. The protection device also includes a second detection circuit for detecting that the power balance is broken and for generating an abnormality signal to stop operation of the inverter based on a detection result.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 21 is a view for describing the operation of the embodiment of FIG. 20;

FIG. 22 is a view for describing the operation of the embodiment of FIG. 20;

DETAILED DESCRIPTION OF THE PREFERRED EMBODIMENTS

Figure 1A:
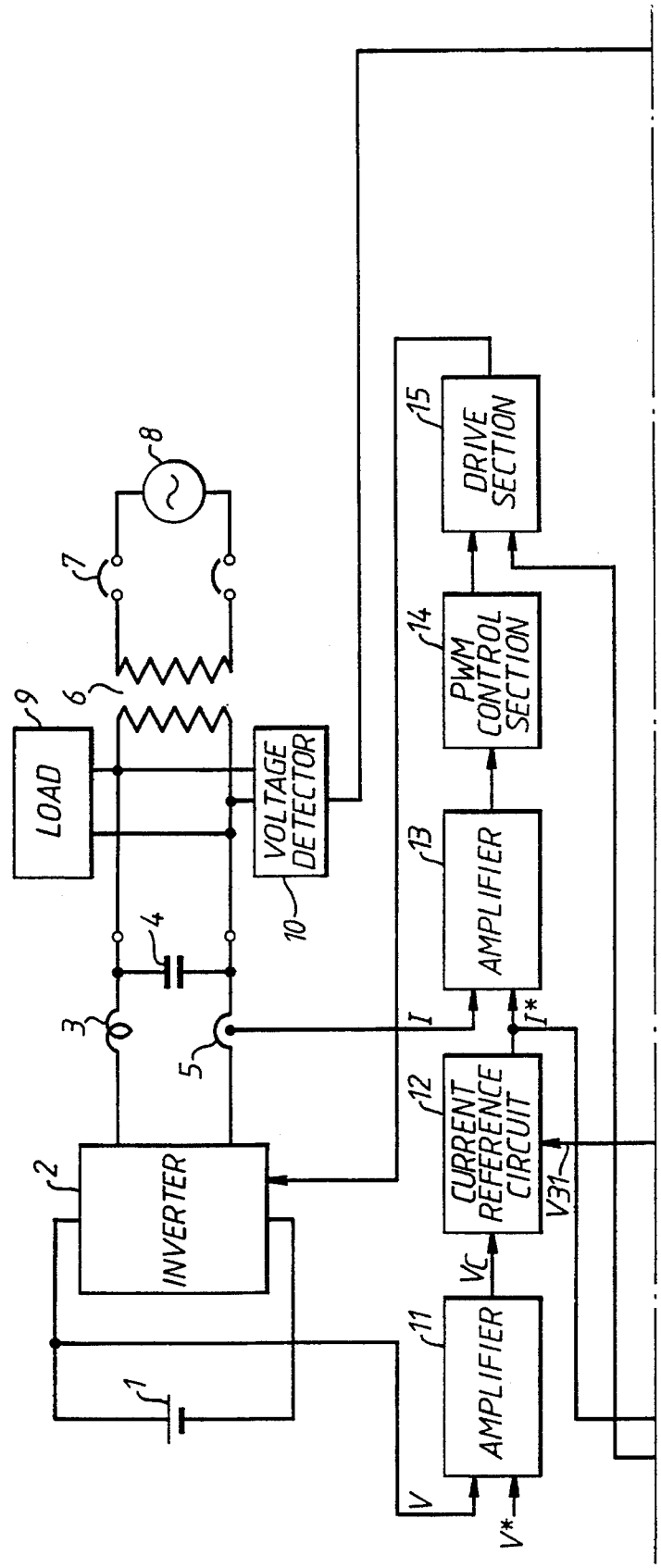
FIGS. 1a and 1b are block diagrams showing an inverter protection device according to an embodiment of this invention.

Referring now to the drawings, wherein like reference numerals designate identical or corresponding parts throughout the several views, the embodiments of this invention will now be described below.

Figure 1B:
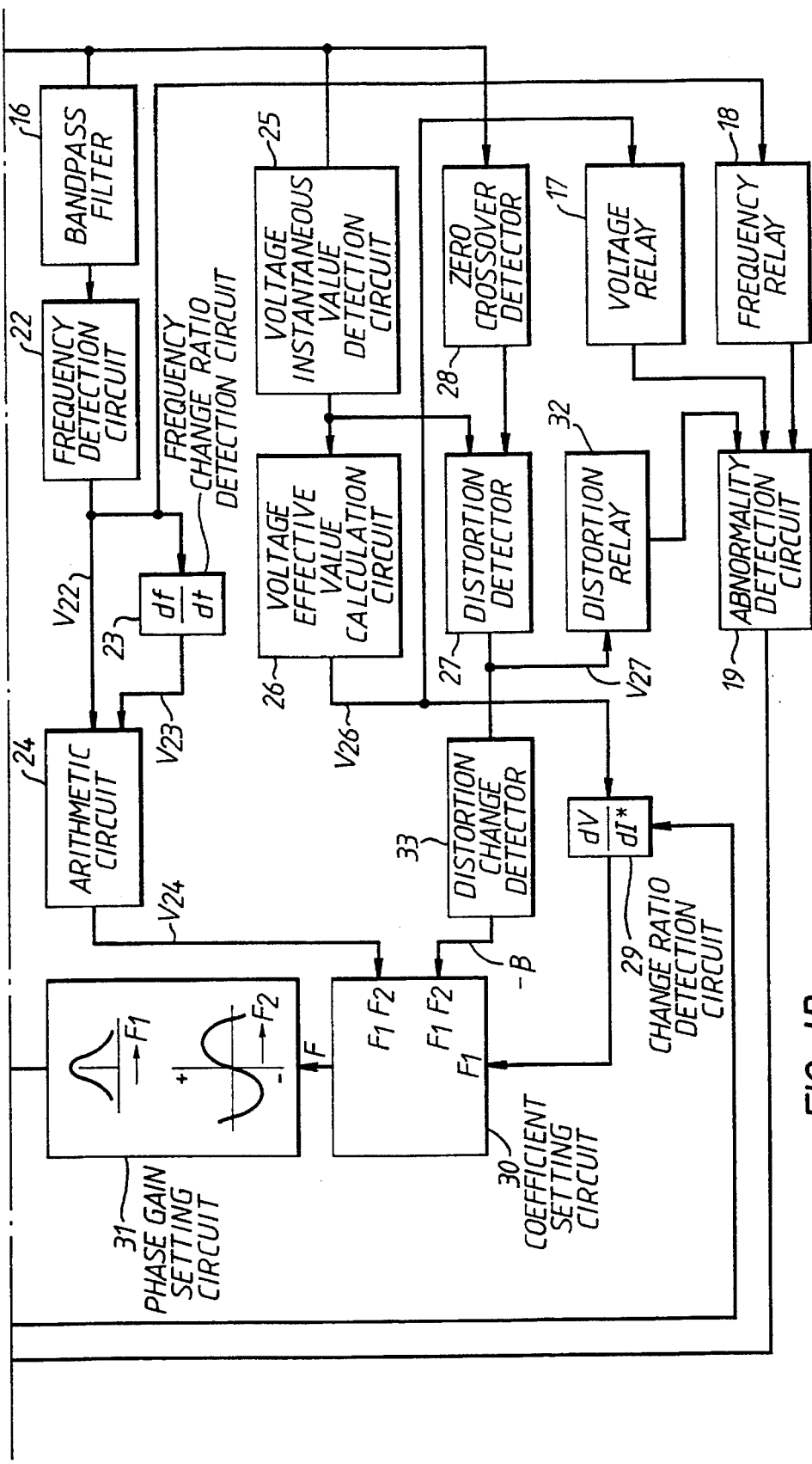

FIG. 1 is a block diagram showing an inverter protection device according to an embodiment of the present invention. In FIG. 1, an AC voltage detected by the voltage detection circuit 10 is input via the bandpass filter 16 into a frequency detection circuit 22, the frequency is detected here and the detected frequency $V_{22}$ is input into a frequency change ratio (df/dt) detection circuit 23 and an arithmetic circuit 24. A frequency change ratio (df/dt) $V_{23}$ detected in the frequency change ratio detection circuit 23 is also input into the arithmetic circuit 24. The frequency $V_{22}$ and the frequency change ratio $V_{23}$ are added in a set ratio in the arithmetic circuit 24 and an output $V_{24}$ (f+α (df/dt):α is a coefficient) is input into a coefficient setting circuit 30.

The AC voltage detected by the voltage detection circuit 10 is also supplied via a voltage instantaneous value detection circuit 25 to a voltage effective value calculation circuit 26. An effective value $V_{26}$ is determined in the voltage effective value calculation circuit 26 and is input into the voltage relay 17. The effective value $V_{26}$ is compared here with a set voltage value, and an AC voltage abnormality is detected and is input into the abnormality detection circuit 19.

The frequency $V_{22}$ of the AC voltage detected by the frequency detection circuit 22 is also input into the frequency relay 18. The frequency $V_{22}$ is compared with a set frequency and a frequency abnormality is detected here, and is input into the abnormality detection circuit 19.

Further, the AC voltage detected by the voltage detector 10 is input into a zero crossover detector 28, a voltage zero crossover is detected here and the detected value is input into a distortion detector 27. The voltage instantaneous value detected by the voltage instantaneous value detection circuit 25 is also supplied to the distortion detector 27. The distortion detector 27 detects a distortion value $V_{27}$ in the vicinity of the AC voltage zero crossover and inputs the detection value $V_{27}$ to a distortion relay 32. The case where the detection value $V_{27}$ is greater than a set value is detected by the distortion relay 32 and is input into the abnormality detection circuit 19. A stop command is supplied to the drive section 15 from the abnormality detection circuit 19 when at least one of the output signals of the voltage relay 17, frequency relay 18 and distortion relay 32 is input into the abnormality detection circuit 19.

The detection value $V_{27}$ of the distortion detector 27 is input into a distortion change detector 33 which detects a distortion change, and an inverted value (−β) of the detection value is supplied to the coefficient setting circuit 30. The current reference I* from the current reference circuit 12 and the effective value $V_{26}$ calculated by the voltage effective value calculation circuit 26 are input into a change ratio detection circuit 29, which detects a change ratio dV/dI* and inputs it into the coefficient setting circuit 30. In the coefficient setting circuit 30, it is judged on the basis of the change ratio dV/dI* of the voltage effective value V and the current reference I* whether or not the voltage has changed because the inverter output current has been changed, that is, whether or not the circuit breaker 7 is opened.

The coefficient setting circuit 30 outputs coefficients F1 and F2 by weighting the input values $V_{24}$, −β and dV/dI*. The detail of the coefficient setting circuit 30 will be described later.

The outputs F1 and F2 of the coefficient setting circuit 30 are input into a phase/gain setting circuit 31 which has a structure such that the phase and gain of the current reference I* can be changed.

The detail of the phase/gain setting circuit 31 will be described later. A sine wave signal $V_{31}$ determined by the phase and gain set in the phase/gain setting circuit 31 is input to the current reference circuit 12. The current reference circuit 12 multiplies the sine wave signal $V_{31}$ and the control signal Vc output by the amplifier 11 and outputs the current reference I* based on the multiplication result.

Next, the operation of the apparatus of the embodiment of the present invention thus constituted will be described.

FIG. 2 shows an example of the characteristics of the phase and gain set by the phase/gain setting circuit 31 based on the coefficients F1 and F2 output from the coefficient setting circuit 30. When the inverter is connected to the AC power system and the circuit breaker 7 is closed, since the system's frequency is maintained at about the rated value $f_0$ (50 Hz or 60 Hz), current with the same phase (power factor=1) as that of the AC power system 8 is output from the inverter, and the current reference I* becomes an output with a gain of 1 (i.e., a solar battery's maximum power point).

Next, the operation at the time of islanding when the circuit breaker 7 is opened will be described by classifying the cases into three cases I-1, I-2 and I-3.

I-1 (ΔQ≠0)

Control is effected in a manner such that the inverter 2 produces an output with a power factor=1, i.e., it does not produce reactive power, when there is imbalance, that is, the difference a ΔQ between the reactive power of the inverter output and the load's reactive power (ΔQ≠0). Specifically, the frequency is $f_0$ and the filter capacitor 4 is regarded as the load.

The frequency $V_{22}$ and the frequency change $V_{23}$ are detected and the arithmetic circuit 24 determines the value $V_{24}$, i.e., f+α (df/dt) (α is a coefficient) based on the input values $V_{22}$ and $V_{23}$. The coefficient values F1 and F2 are set by the coefficient setting circuit 30 taking the value $V_{24}$ as a weighting. The phase/gain setting circuit 31 determines the phase and gain of the sine wave signal $V_{31}$ based on the input coefficient values F2 and F1, as shown in FIG. 2. Then the phase and magnitude of the current reference I* are changed based on the sine wave signal $V_{31}$, thereby to change the phase and magnitude of the inverter current.

Figure 26A:
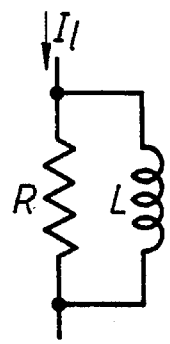
FIG. 26 is a view showing the load condition given in explanation of this invention.
Figure 26B:
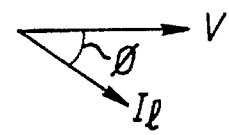
Figure 26C:
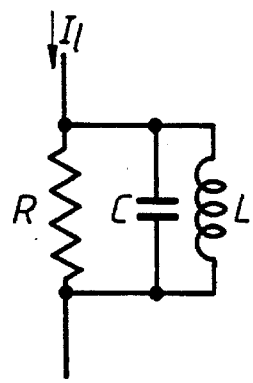

Next, the operation in the case where only the current phase is changed will be described by setting F2=$V_{24}$. In this case, if the load has a lagging power factor as in FIG. 26(e), the frequency of the AC voltage for balancing the inverter current $I_{IN}$ and the load current $i_l$ becomes slightly higher, and the load power factor tries to become 1 through an increase in the capacitor current and a reduction in the reactor current. In the case of FIG. 26(e), f+α (df/dt)>$f_0$ and so the coefficient setting circuit 30 outputs the coefficient value F2 larger than the rated value $f_0$. As the phase determined by the coefficient value F2 is leading, the phase of the inverter current is advanced by this control. As a result, the frequency of the AC voltage rises still further, since the load current and inverter current phases are not matched. As this operation constitutes positive feedback, the frequency rises still further toward infinity. But if the characteristic is so set that, as shown in FIG. 2, the current phase lags when the coefficient value F2 goes beyond a certain range, the load and inverter power factors are matched and a balance is established at, e.g., a point Fa, where the line $L_0$ showing the phase characteristic crosses the line $L_1$ showing the lagging phase angle of the load 9.

Figure 2A:
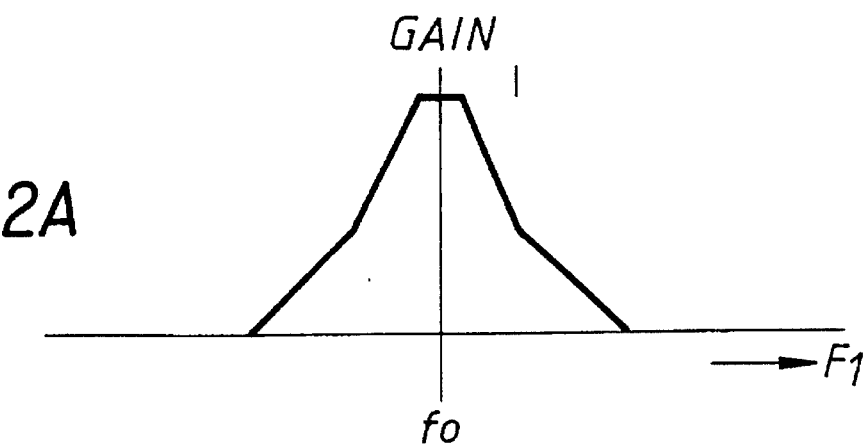
FIG. 2 is a view for describing the characteristics of a phase/gain setting circuit 31 of FIG. 1.
Figure 2B:
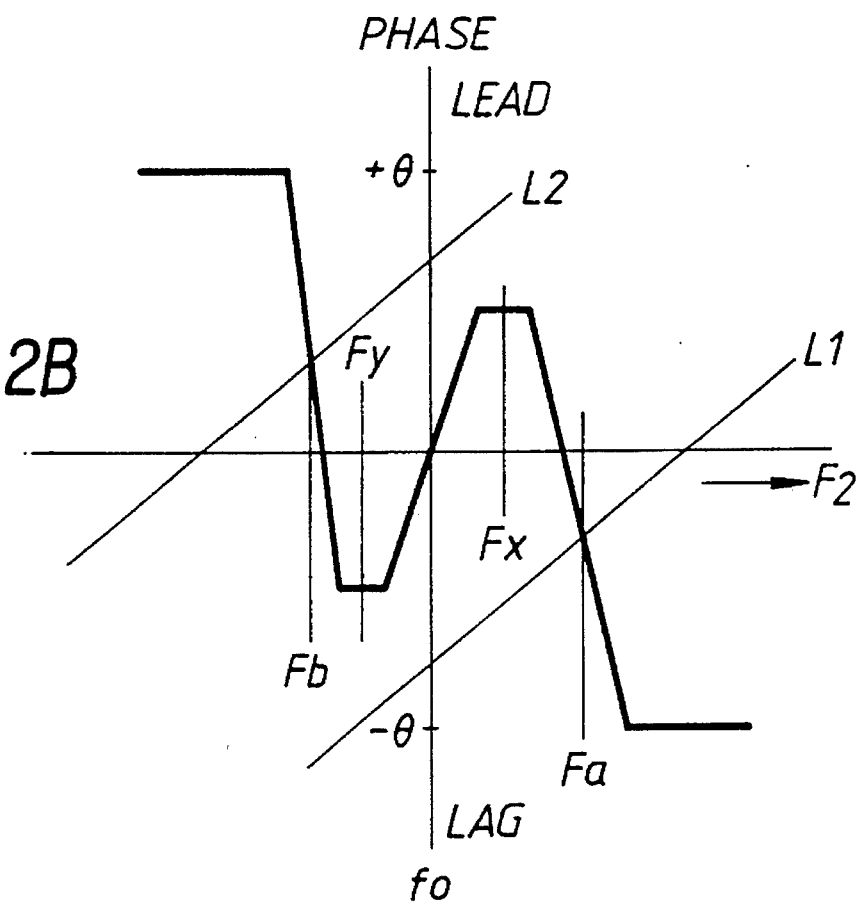
Figure 26D:
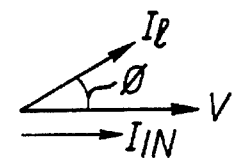
Figure 26E:
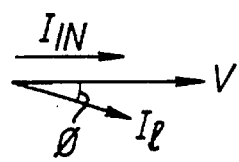

In the case that the load has a leading power factor as shown in FIG. 26(d), at the time of islanding, the effect is that in order to make the inverter power factor and the load power factor match, there is an action to balance reactive power through a fall in the voltage frequency, a fall in the capacitor current and an increase in reactor current. Since the frequency falls and f+α (df/dt)<$f_0$, the coefficient setting circuit 30 outputs the coefficient value F2 smaller than the rated value f. The phase determined by the coefficient F2 is lagging as shown in FIG. 2(b). Accordingly, there is a control such that the inverter current lags and so, the frequency of the AC voltage falls still further.

Through a positive feedback action, the AC voltage frequency falls still further toward zero. But if the characteristic is so set that, as shown in FIG. 2, the current leads when the coefficient value F2 goes below a certain value, the load and inverter power factors are matched and a balance is established at, e.g., a point Fb, where the line $L_0$ showing the phase characteristic crosses the line $L_2$ showing the leading phase angle of the load 9.

As the balance is established at the point Fa or Fb as described above, if the frequency relay 18 is, e.g., set at points Fx or Fy, islanding can easily be detected and the inverter 2 can be stopped when the difference $\Delta Q$ is not 0.

In this case, since the frequency is caused to diverge (the current phase is advanced when the frequency rises), it is undesirable to the load for the voltage to become high. The coefficient setting circuit 30 outputs the coefficient value F1 ($=V_{24}$), and the phase/gain setting circuit 31 sets the gain characteristic as shown in FIG. 2(a). By setting this, it is possible to lower the inverter current and lower the AC voltage so as to actuate the voltage relay 17 when the frequency deviation becomes large, with the result that the preferable control is attained.

I-2 ($\Delta Q=0$, $\Delta P \neq 0$)

Next, the case where the difference $\Delta Q$ is 0 and there is imbalance, that is, the difference $\Delta P$ between the load's active power and the inverter's active power, is not 0, will now be considered. In this case, it is assumed that the equivalent circuit of the load is shown in FIG. 26(c).

In FIG. 26(c), active power is consumed only by a resistor R, since a capacitor C and a reactor L do not consume active power. If the voltage applied to the load 9 is designated as (V+$\Delta V$) (V is the rated voltage), the power consumed by the resistor R is $(V+\Delta V)^2/R$. $\Delta V$ is the amount of voltage change in islanding.

Therefore, $\Delta P=[(V+\Delta V)^2/R]-[V^2/R]$, and so if the difference $\Delta P$ is more than a set amount, the voltage (V+$\Delta V$) is more than a set value and becomes larger than the set voltage, and it is detected by the voltage relay 17 and the inverter 2 can be stopped.

I-3 ($\Delta Q=0$, $\Delta P=0$)

Next, the case in which detection is the most difficult and the difference $\Delta Q$ is completely 0 and the difference $\Delta P$ is approximately 0 will now be considered.

Figure 3A:
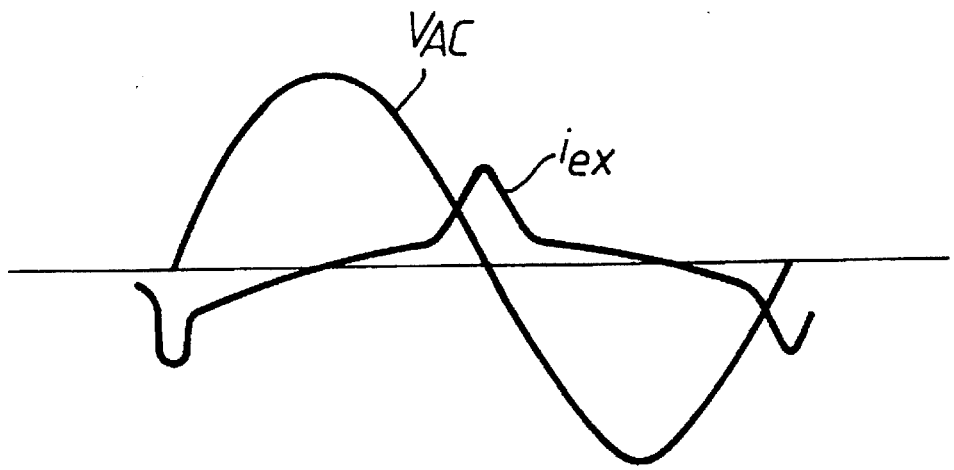
FIG. 3 is a waveform chart for describing the operation of the inverter protection device of FIG. 1.

FIG. 3(a) shows the relation between AC voltage $V_{AC}$ and the excitation current $i_{ex}$ of the pole-mounted transformer 6. Because of the core's saturation characteristic, the excitation current $i_{ex}$ differs from a sine wave and has a peak current form in the vicinity of AC voltage zero crossover. When the circuit breaker 7 is closed, the excitation current $i_{ex}$ is supplied from the AC power system 8 and a sinusoidal voltage $V_{AC}$ with little voltage distortion is maintained.

Figure 3B:
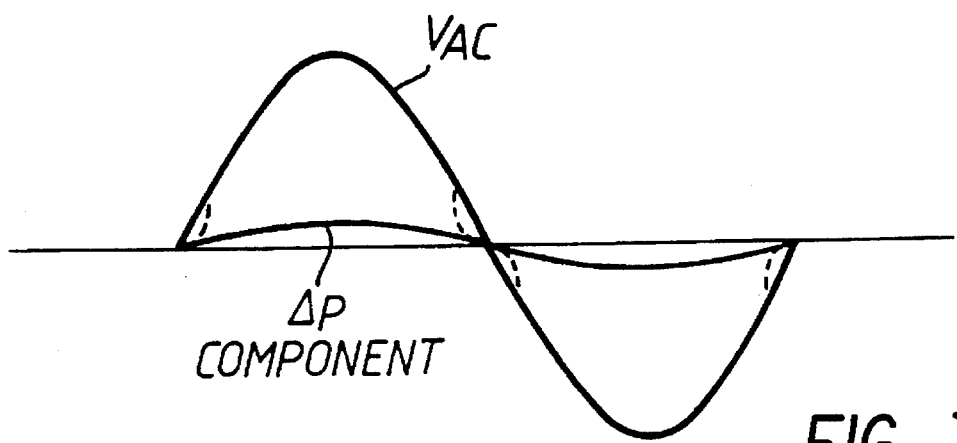

However, if the circuit breaker 7 is opened when the difference $\Delta Q$ is 0 and the difference $\Delta P$ is approximately 0, the result is that pole-mounted transformer 6 excitation current $i_{ex}$ is received from the inverter 2 and the load 9. Since the difference $\Delta Q$ is 0, power is balanced when the power factor is 1 and so the difference $\Delta P$ is just the slight sine wave component shown in FIG. 3(b) and it is not possible to effect a satisfactory peak current supply in the vicinity of voltage zero crossover. As a result, the voltage falls and distortion increases in the vicinity of voltage zero crossover, as indicated by the voltage $V_{AC}$ shown by a dashed line in FIG. 3(b).

This distortion is detected by the distortion detection circuit 27 and the distortion change detection circuit 33 so as to detect the possibility of islanding. Namely, the distortion change detector 33 applies the inverted value ($-\beta$) of the detected value of the distortion change to the coefficient setting circuit 30, which sets the coefficient values F1 and F2 based on the inverted value ($-\beta$). The phase-gain setting circuit 31 outputs the signal $V_{31}$ with the phase and gain determined by the coefficient values F1 and F2 based on the characteristics show in FIG. 2.

Here, the horizontal axis F1 of the gain characteristic and the horizontal axis F2 of the phase characteristic in FIG. 2 are shifted toward negative direction and the power balance is broken, the frequency and voltage are caused to fluctuate and the inverter 2 is stopped by operating the voltage relay 17 and frequency relay 18.

It is better to match the horizontal axis F2 to the direction of f+$\alpha$ (df/dt), but in the case that f+$\alpha$ (df/dt)=$f_0$, shifting the frequency to the lower side by setting F2=$-\beta$ makes it possible for the balance in islanding in respect of the motor load to be broken more quickly.

It is also possible for the inverter 2 to be stopped via the abnormality detection circuit 19 directly by the distortion relay 32 when the output $V_{27}$ of the distortion detection circuit 27 becomes more than a set value, not via the coefficient setting circuit 30 and the phase/gain setting circuit 31.

When an increase in distortion is detected by the distortion change detection circuit 33 and the horizontal axis F1 is shifted, the current reference I* changes. The change ratio dV/dI* is detected by the voltage change ratio (dV/dI*) circuit 29. And it is also possible to add a circuit for breaking the balance by effecting positive feedback to the horizontal axis F1 when the change ratio dV/dI* exceeds a set value in an islanding state.

When the phase is changed, it is better to detect the voltage fluctuation in respect of the active current dV/dI* cos$\phi$ (cos$\phi$=power factor). Though not shown in the circuit of FIG. 1, the same effect is of course expected by using the detected current I in place of the current reference I*.

In the embodiment described above, when the inverter 2 is cut off from the AC power system 8 during operation with the inverter 2 and the AC power system 8 connected, if there is imbalance, even if only slight, between the reactive power of the inverter output and the load's reactive power, the frequency rises or falls slightly. This shift in frequency is detected and control is effected in a manner such that if the frequency has risen the inverter current phase is advanced so as to cause the frequency to rise still further, while if the frequency has fallen the current phase is delayed and divergence in the direction to lower the frequency is effected.

As the frequency moves further from the rating, a fall in voltage is accelerated by lowering the value of the inverter current and reducing the supply of effective power.

Since neither the voltage nor the frequency changes when the active components and reactive components of the powers are perfectly balanced, an increase in voltage waveform distortion is detected and a move from a balanced state to a diverging operation is made by changing the current phase and magnitude. Islanding can be prevented more reliably in this embodiment.

Next, the detail of the coefficient setting circuit will be described.

The coefficient setting circuit 30 outputs the coefficient values F1 and F2 by weighting the input values $V_{24}$, $-\beta$ and dV/dI*. The case where F1=$V_{24}$ and F2=$V_{24}$ and the case where F1=$-\beta$ and F2=$-\beta$ have been described.

Generally, the input values are weighted according to the following order of priority.

(1) a frequency f (an output $V_{24}$ where $\alpha=0$)

(2) a frequency change ratio (an output $V_{24}$ where $\alpha \neq 0$)

(3) a inverter value $(-\beta)$ of a distortion change ratio (4) a change ratio $dV/dI^*$ Firstly, it is set that F1=f and F2=f and the inverter 2 is controlled based on the thus set values. In this case, it is confirmed whether or not an abnormality can be detected within a set time after the circuit breaker 7 is opened. If the abnormality is detected within the set time, setting of F1=f and F2=f is decided.

If the abnormality is not detected within the set time, a next step is tried. Specifically, it is set that $$F1 = V24\left(f + \alpha \frac{df}{dt}\right) \text{ and } F2 = V24\left(f + \alpha \frac{df}{dt}\right)$$

and the same confirmation as described above is made. If the abnormality is not detected within the set time, a further next step is tried, in which the coefficient values F1 and F2 are set by adding the inverted value $(-\beta)$ with weights to the previously set coefficient values F1 and F2, respectively. Then the same confirmation is made.

If the abnormality is set detected within the set time yet, only the coefficient value F1 is set by adding the change ratio $dV/dI^*$ with a weight to the previously set coefficient value F1. After that the same confirmation is made.

Specifically, it is sufficient that the coefficient values F1 and F2 are set in the condition that several weights are selected and the confirmation is made whether or not the abnormality can be detected within the set times in such condition with a well-known simulation method.

It is possible to set that F1=$-\beta$ and F2=$-\beta$ substantially by selecting the weight value to be a specific value. It is also possible to set the coefficient values F1 and F2 not by a combination of the input values $$f, \frac{df}{dt}, -\beta \text{ and } dV/dI^*$$

but by a single value of the input values.

The cases are described above where the priority with respect to the time is given in setting the coefficient values F1 and F2. It is further possible to determine the coefficient values F1 and F2 based on a plurality of input values simultaneously using a fuzzy control.

The function of the coefficient setting circuit 30 is as described above, and can be easily implemented by a microcomputer or a combination of well-known hardware components by those skilled in the art. So, the detailed description of the construction of the coefficient setting circuit 30 may be omitted.

Next, the detail of the phase/gain setting circuit 31 will be described.

The phase/gain setting circuit 31 sets the gain and phase for the current reference I* based on the coefficient values F1 and F2 set by the coefficient setting circuit 30 and outputs the sine wave signal $V_{31}$ based on the set result. The case where the phase and the gain are set as shown in FIG. 2 has been described.

Generally, the phase is set so as to shift in the direction to diverge the frequency based on the input coefficient value F2.

Specifically, in the case that the coefficient value F2 is set to be a frequency f, the phase is set so as to either advance or delay in accordance with the rise or fall of the frequency.

In the case that the coefficient value F2 includes the frequency change ratio df/dt, the phase is set such that the phase is either advanced or delayed according to the increase or decrease of the frequency change ratio df/dt.

Next, the case that the coefficient value F2 includes the inverted value $(-\beta)$ of the distortion change ratio is described below. When the frequency change ratio is 0 and the distortion changes in the direction to increase it, the phase is set so as to delay thereby to decrease the frequency based on the coefficient value F2. But when the frequency increases or the frequency change ratio is positive, the phase is set so as to advance thereby to increase the frequency.

As for the gain, it is set based on the coefficient value F1. Examples of setting the gain are shown in FIG. 2(a) and FIG. 4(b).

Generally, it is preferable that the gain is set so as to lower it thereby to lower the inverter current when the frequency deviation becomes large.

The present invention is not limited to the embodiment described above but may be practiced and modified as follows.

(1) Although the case where the horizontal axes F1 and F2 are shifted by the output $V_{24}$ f+$\alpha$ (df/dt) in the phase/gain setting circuit 31 in the embodiment described above, it is also possible to shift the axes F1 and F2 by a value $(A(f-f_0)+f_0+\alpha (df/dt))$ (A is a coefficient). If it is set that A=0, the phase is shifted only when the frequency changes, and in normal situations it is possible to have power factor=1 operation irrespective of the frequency f. It is also possible to make adjustments such as multiplying the frequency change ratio feedback by a time coefficient to match the response time of the AC power system 8, etc.

Figure 4A:
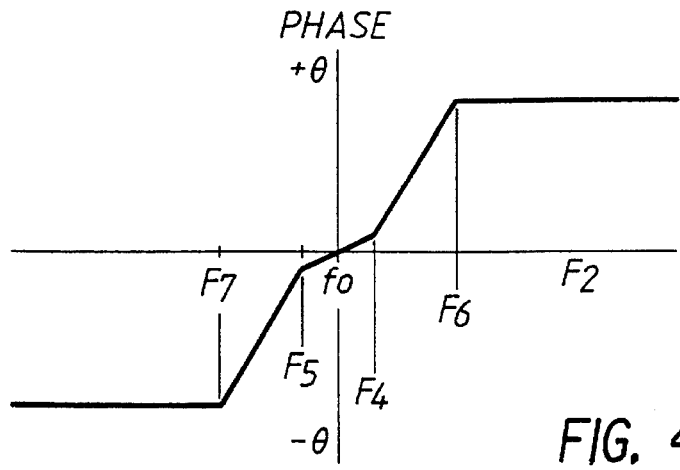
FIG. 4 is a view for describing other characteristics of a phase/gain setting circuit 31 of FIG. 1.
Figure 4B:
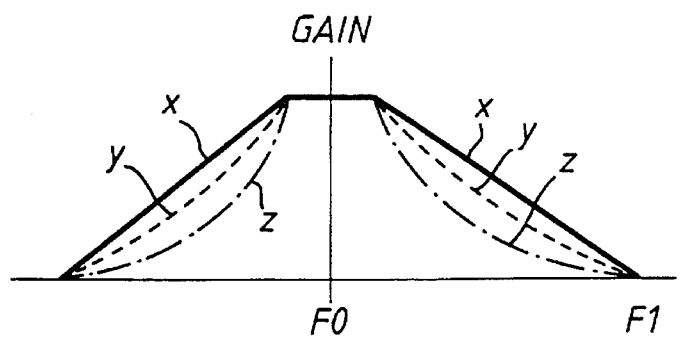

(2) There is no need to explain that it is possible to have many variations relating to the phase characteristic, such as improvement of the power factor during normal operation by making the rate of change of the phase angle $\Theta$ gentle (or zero) in the normal system frequency operation range $F_5-f_0-f_4$ and making the rate of change of the phase angle $\Theta$ large outside this range, as shown in FIG. 4(a).

Figure 4C:
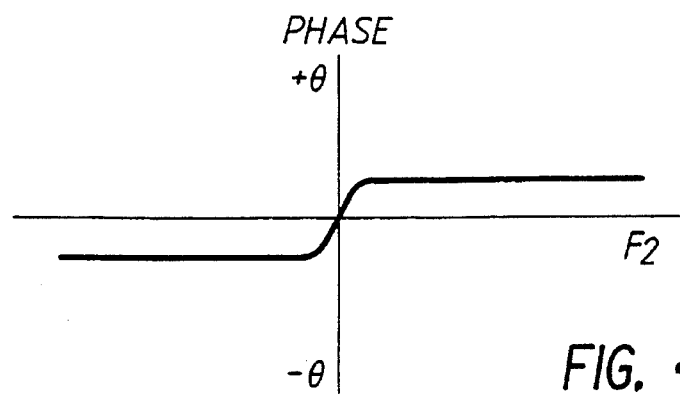

It is also possible to prevent deterioration of the power factor by making the change in the phase angle $\Theta$ large in the vicinity of the rated frequency and imposing a limit on changes above this change, as shown in FIG. 4(c).

(3) It is also possible to have a variation for the gain characteristic set in the phase/gain setting circuit 31 in which, as shown in FIG. 4(b), curves such as x, y, z, etc. are prepared and a shift from the curve x to the curve z is effected in accordance with changes in the value dV/dI, cos$\phi$ or with a time function.

(4) The control circuit of FIG. 1 can easily be produced by using a microprocessor and a memory circuit. In particular, characteristics set by the phase/gain setting circuit 31 which are similar to those of the bandpass filter 16 in respect of gain but in which the phase characteristic is completely inverse can be freely stored in a memory circuit. In an analog circuit, this can be achieved by making separate use of a bandpass filter characteristic and a notch filter phase characteristic.

(5) In FIG. 1, frequency, the frequency change ratio, the value dV/dI* and distortion changes, etc. are input into the coefficient setting circuit 30, but there is no need to explain that there may be combined in any way and that distortion changes can be detected through higher harmonic change ratios.

(6) In cases where inverter power factor control is included for voltage stabilization, control may be effected with an addition of the phase characteristics of FIG. 2 to power factor control angles.

In this case, it is preferable to hold the power factor control when the distortion ratio increases or the value dV/dI* cos$\phi$ exceeds a set value.

(7) The phase/gain setting circuit 31 of FIG. 1 can of course be realized by using the filter having the characteristics shown in FIG. 5 and FIG. 6. In this case, the coefficient setting circuit 30 outputs the frequency f as the coefficient values F1 and F2 to the phase/gain setting circuit 31.

Figure 5A:
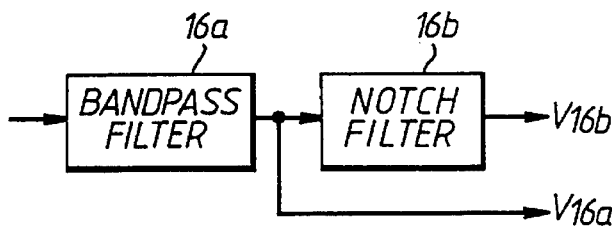
FIG. 5 is a view for describing another embodiment of this invention.
Figure 5B:
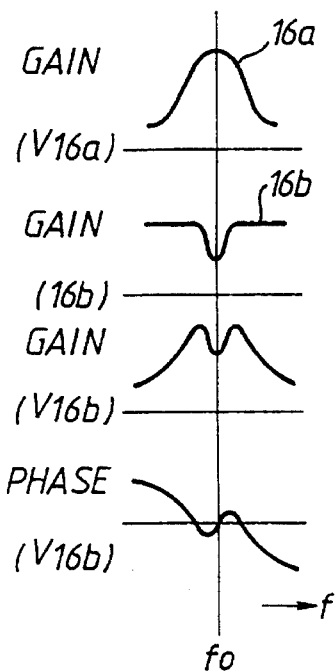

The characteristics of FIG. 5 and FIG. 6 can easily be produced by using analog filter technology (especially switched capacitor filters). For example, it is possible to obtain the gain and phase characteristics V16b of FIG. 5(b) by using a single LTC1060 IC of the Linear Technology Company to connect a bandpass filter 16a and a notch filter 16b, having gain characteristics 16a and 16b shown in FIG. 5(b), respectively, of FIG. 5(a) in series. In this case, the phase/gain setting circuit 31 sets the gain by the gain characteristics of an output $V_{16a}$ and the phase by the phase characteristics of an output $V_{16b}$ and generates the single $V_{31}$ based on the gain and phase thus set.

Figure 6A:
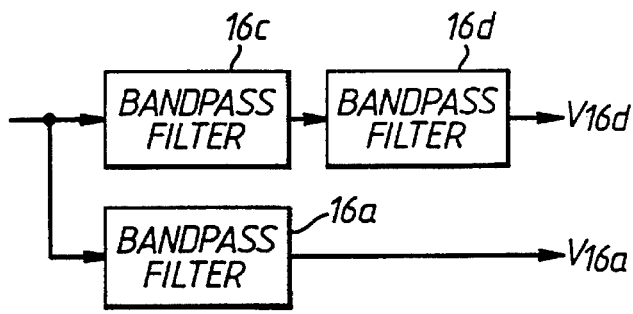
FIG. 6 is a view for describing still another embodiment of this invention.
Figure 6B:
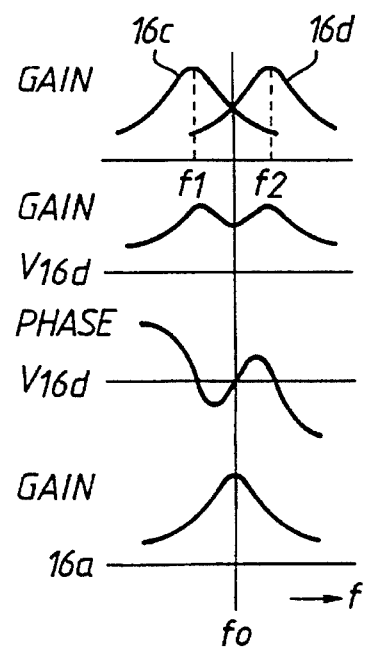

Further, there is no need to explain that characteristics such as shown in FIG. 6(b) can be obtained by connecting bandpass filters 16c and 16d with gain characteristics 16c and 16d and with slightly different center frequencies ($f_1$ and $f_2$) shown in FIG. 6(b), respectively, in series as shown in FIG. 6(a). The bandpass filter 16a has $f_0$ as its center frequency. In this case, the phase/gain setting circuit 31 sets the gain and the phase by the gain and the phase characteristics of the output of $V_{16a}$ and an output of $V_{16d}$, respectively, and generates the signal V31 based on the gain and phase thus set.

It is also possible to obtain the phase and gain characteristics by adding the outputs of the bandpass filters 16c and 16d and use the characteristics for setting the phase and the gain in the phase/gain setting circuit 31.

It is also possible to add the characteristics of the phase/gain setting circuit 31 to the characteristics of the bandpass filter 16.

(8) There is no need to explain that the basic operation does not change even if the gain setting of the phase/gain setting circuit 31 of FIG. 1 is made constant.

The embodiment of the present invention described above makes it possible to provide an inverter protection device with which islanding is prevented with good reliability.

Another embodiment of this invention is described below with reference to the drawings. This embodiment corresponds to one example of the embodiment shown in FIG. 1, in which the frequency $V_{22}$ (f) detected by the frequency detection circuit 22 is input to the coefficient setting circuit 30 via the arithmetic circuit 24, the coefficient setting circuit 30 outputs the coefficient value F2 (=f) and the phase/gain setting circuit 31 sets only the phase based on the coefficient value F2 with the gain keeping 1.

Another embodiment of an inverter protection device according to this invention is described with reference to FIG. 7.

Figure 7:
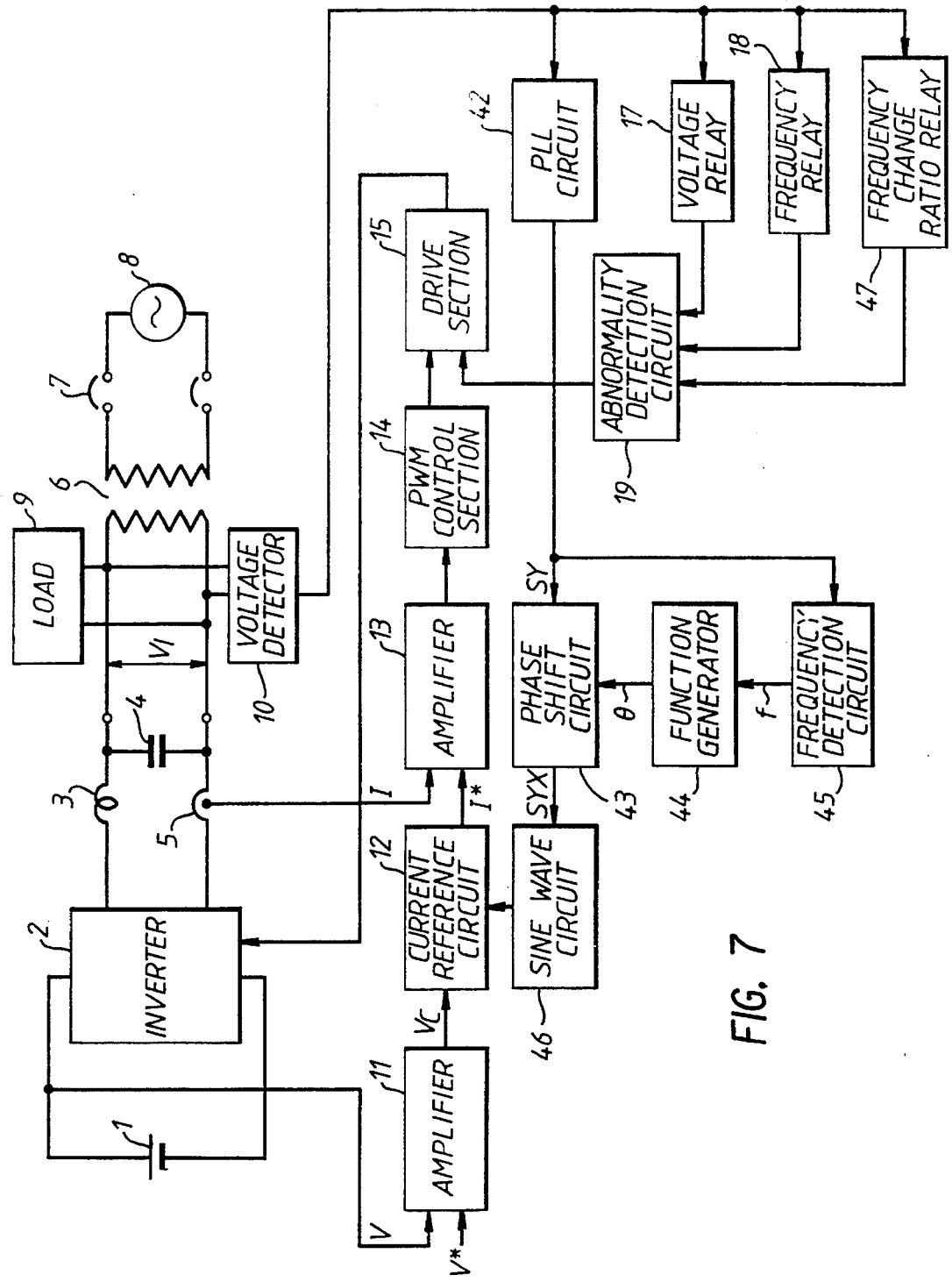
FIG. 7 is a block diagram showing an inverter protection device according to another embodiment of this invention.

In FIG. 7, the AC voltage $V_1$ supplied to load 9 is detected through the voltage detector 10 and a signal SY synchronized with the AC voltage $V_1$ is obtained by a PLL (phase locked loop) circuit 42.

A frequency detection circuit 45 detects the frequency f of the AC voltage $V_1$ from the signal SY and a function generator 44 generates a signal Θ corresponding to the frequency f. The details of the function generator 44 will be described later. A phase shift circuit 43 outputs a synchronization signal SYX whose phase changes depending on the signal Θ. In this case, if the AC voltage $V_1$ is of the rated frequency, the synchronization signal SYX of phase such that the power factor is practically 1 is output.

A sine wave synchronized with the AC voltage $V_1$ is obtained by a sine wave circuit 46 through the phase shift circuit 43 from this signal SY and is applied to the current reference circuit 12. Thus a sine wave current reference I* having an amplitude proportional to the output Vc of the amplifier 11 and synchronized with the AC voltage $V_1$ is output from the current reference circuit 12.

An example of a function generator 44 is shown in FIG. 8.

Figure 8A:
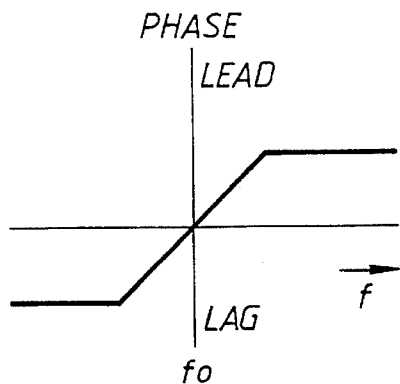
FIG. 8 is a view for describing the characteristics of a function generator 44 of FIG. 7.

FIG. 8(a) shows the case where the phase is advanced or is lagged in proportion to the rise or fall in frequency with respect to the rated frequency $f_0$, respectively, and is limited to a fixed limit.

When the power source frequency departs from the rated frequency $f_0$, the power factor deviates from 1, but, if the AC power system 8 is connected to the inverter 2, the change in frequency is very small, so the power factor remains practically 1.

Figure 8B:
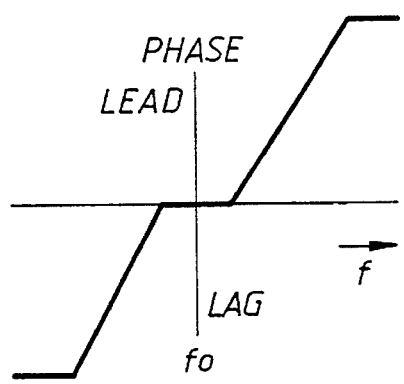

FIG. 8(b) shows the method in which the phase does not change in the vicinity of the rated frequency $f_0$, so the power factor is 1, but, when the frequency has deviated by more than a fixed value from the rated frequency $f_0$, phase shifting is performed.

Figure 8C:
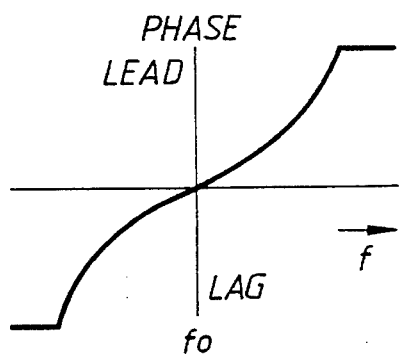

FIG. 8(c) shows the method in which the change of phase is gentle in the vicinity of the rated frequency $f_0$, but as the frequency departs more from the rated frequency $f_0$, the phase shift is increased.

Figure 8D:
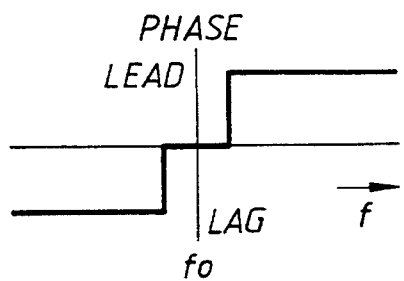

FIG. 8(d) This shows the method in which the phase is unchanged in the vicinity of the rated frequency $f_0$, so that a current of power factor 1 is output from the inverter. But when the frequency deviates from the rated frequency $f_0$ by more than a fixed value, a fixed phase shift is applied.

Various other methods may be considered.

The output of voltage detector 10 (in general, a transformer is employed) is applied to the voltage relay 17, frequency relay 18 and a frequency change ratio relay 47 which detects the amount of change of the frequency. The outputs of the three relays 17, 18 and 47 are applied to the abnormality detection circuit 19, which detects an abnormality and shuts down the inverter 2 by turning off the drive section 15.

In the above layout, let us consider the case where the circuit breaker 7 is opened in the condition with the current in the load 9 and the inverter output current are practically in balance.

Figure 9A:
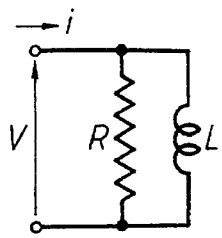
FIG. 9 is a view showing the load condition, given in explanation of the operation of the embodiment of FIG. 7.
Figure 9A:
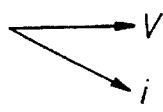
Figure 9B:
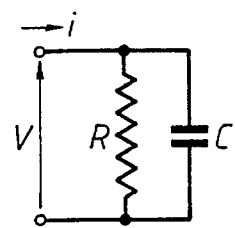
Figure 9B:
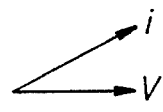
Figure 9C:
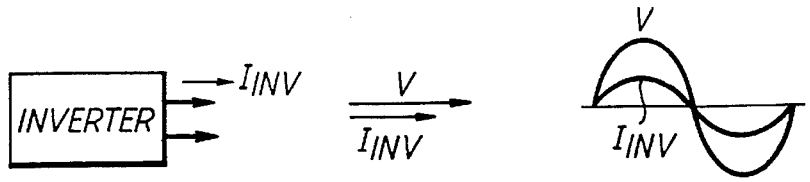

The output current of the inverter, as essentially shown in FIG. 9(c), has a power factor of approximately 1 i.e. it is controlled such that the voltage V and the inverter current $I_{INV}$ are practically in the same phase.

In the case that the load 9 is of a logging power factor, and has an inductance L as shown in FIG. 9(a), the frequency is raised in order for the inverter output current and load current to be operated in balance. An operation is effected in the direction such as to raise the frequency of the AC voltage so as to reduce the current flowing in inductance L. During this process, the frequency detection circuit 45 detects the rise in frequency and acts to slightly advance the current phase of the inverter. When this happens, there is a positive action to further raise the frequency of the AC power source to produce a state of balance between the load current and the inverter current. The frequency relay 18 and the frequency change ratio relay 47 detect the rapid increase in frequency of the AC power source. The inverter 2 is then shut down by abnormality detection circuit 19. Specifically, in the case of a lagging power factor load, the device acts positively to destroy balance by supplying an advance current.

Next, in the case of an advancing power factor, where the load 9 has a capacitance C as shown in FIG. 9(b), the frequency falls in order for the inverter output current and load current to operate in balance, and a shift takes place so as to reduce the current flowing in capacitor C so as to approach a load of power factor 1.

When frequency detection circuit 45 detects the drop in frequency, the phase shift circuit 43 is actuated to delay the inverter current phase. Thereupon, there is a further fall in frequency and the phase of the voltage of the capacitor C is delayed. That is, a positive action takes place to lower the frequency, thereby producing a rapid drop in the frequency of the AC power source. In other words, balance is rapidly lost by supplying a lagging current to an advanced power factor load.

This is detected by the frequency relay 18 and the frequency change ratio relay 27, causing abnormality detection circuit 19 to shut down the inverter 2.

It should be noted that, in the case of a load of power factor 1, if the inverter output current and the load current are not in balance, the voltage becomes abnormal, which is detected by the voltage relay 17, causing the abnormality detection circuit 19 to shut down the inverter 2.

Figure 9D:
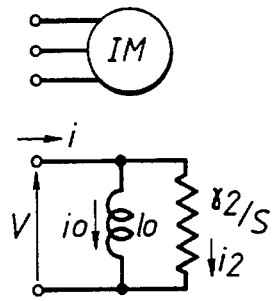
Figure 9E:
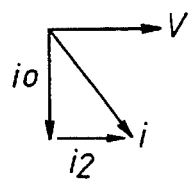

Next, let us consider the case of FIG. 9(d), in which an induction motor IM, for which islanding detection was previously considered to be the most difficult, is connected as the load 9. The equivalent circuit in this case is approximated by a parallel circuit of an excitation inductance $l_0$ and the secondary resistance r2 of the induction motor IM divided by the "slip" S. The voltage and current vectors are then as shown in FIG. 9(e). Current i2 is the torque part current and current i0 is the flux part current.

The frequency of the back electromotive force of the induction motor IM is proportional to the frequency (f-fs) (where fs is the "slip" frequency), i.e. it is proportional to the speed of revolution of the induction motor IM (f is the power source frequency). Consequently, when the current is broken by the circuit breaker 7, the frequency of the AC power source is (f-fs).

When this frequency is detected, it is lower than the power source frequency, so a lag current is output from the inverter 2 by the phase shift circuit 43. A current i delayed from that of FIG. 9(e) therefore flows to the inductive motor IM. As a result, the torque part current i2 is decreased or becomes negative, so the motor IM is slowed down. This acts as a positive feedback, so the AC power source frequency rapidly falls from the free-running frequency causing the frequency relay 18 to actuate abnormality detection circuit 19 to shut down the inverter 2.

As described above, with the embodiment of this invention, the frequency change is increased by shifting the current phase of the inverter 2 in the direction such as to promote frequency change on islanding. This change is detected by the frequency relay or the frequency change ratio relay 47 and the inverter 2 is thereby shut down. An inverter protection device can thereby be obtained in which islanding can be rapidly prevented.

Figure 10:
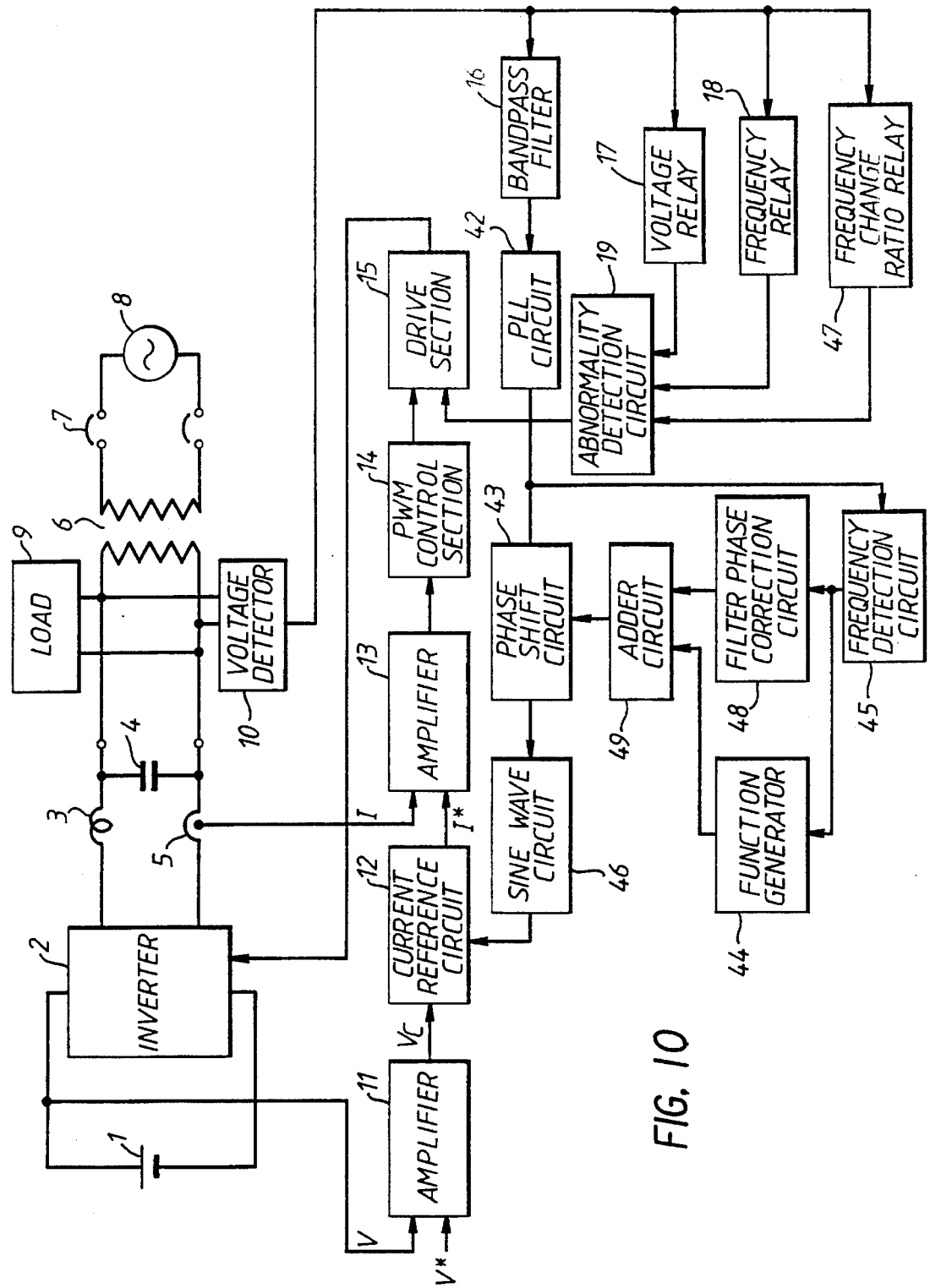
FIG. 10 is a block diagram showing an inverter protection device according to still another embodiment of this invention.

Another embodiment of this invention is illustrated in FIG. 10. A filter circuit 16 is inserted ahead of the PLL circuit 42 in FIG. 7, and a filter phase correction circuit 48 is provided that corrects the amount of phase shift produced by the filter circuit 16 in the necessary frequency range.

Further, an adder circuit 46 is provided that adds the output of the filter phase correction circuit 48 and the output of the function generator 44. In this case, exactly the same action as in FIG. 7 can be performed by detecting the frequency by means of the frequency detection circuit 45, and applying a phase shift by means of the phase shift circuit 43 based on the output of the adder circuit 29.

The same application as in the case where detection is performed by the zero cross method can of cource be achieved without using PLL circuit 42 in FIG. 10. If the phase lag of the filter is small in the range of use, the filter phase correction circuit 48 can of course be dispensed with.

Furthermore, the accuracy of detection of islanding can be increased by adding a distortion rate detection circuit as an input to the abnormality detection relay 19.

Figure 11A:
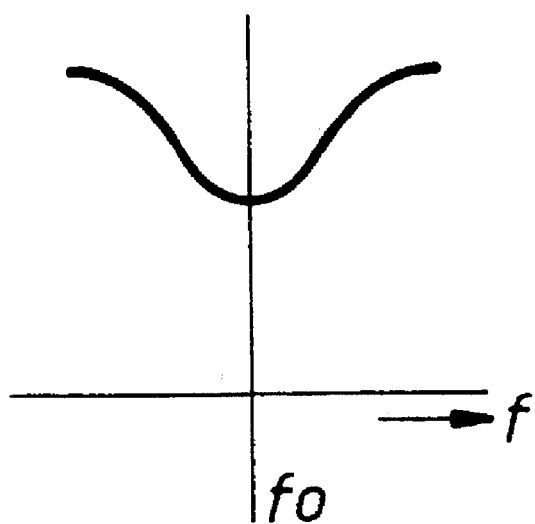
FIG. 11 is a view for describing another embodiment of this invention.
Figure 11B:
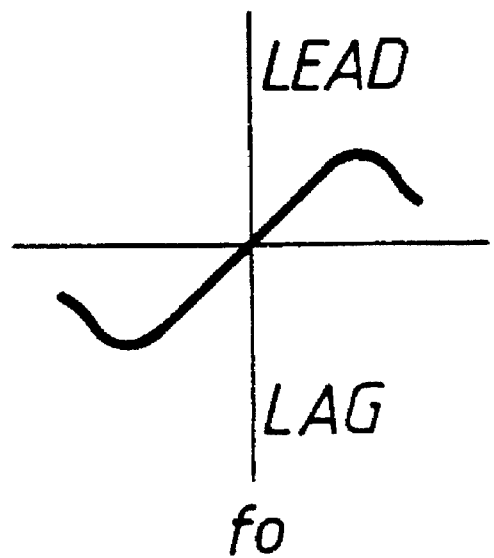

The circuit for advancing or delaying the phase when frequency rises or falls can be constituted as a notch filter having the characteristics as shown in FIG. 11. This can be used as the function generator 44. For practical use, the frequency relay 18 may be employed that identifies islanding at say ±1 Hz of the rated frequency. It is therefore sufficient to advance or delay the phase within this range.

In FIG. 7, the phase of the AC voltage V1 is detected by the PLL circuit 42. The output signal SY is applied to the phase shift circuit 43 and the frequency detection circuit 45. This invention is not limited to this embodiment. It is possible that the phase shift action is effected in the PLL circuit 42A as shown in FIG. 12.

Generally, the PLL circuit 42A is constructed as described below. A phase difference detection circuit 42a detects the phase difference between the AC voltage V1 and the output signal SYX of a 1/N counter 42d. An integrator 42b integrates the phase difference in positive or negative polarity depending on the advanced or lagging phase difference and generates a signal S42b. A voltage-frequency converter 42c generates a frequency S42c proportional to the signal S42b. The 1/N counter 42d counts down the frequency S42c to generate the signal SYX. Thus, the PLL circuit constitutes a phase locked loop in which the phase of the signal $V_1$ is the same as that of the signal SYX.

Figure 12:
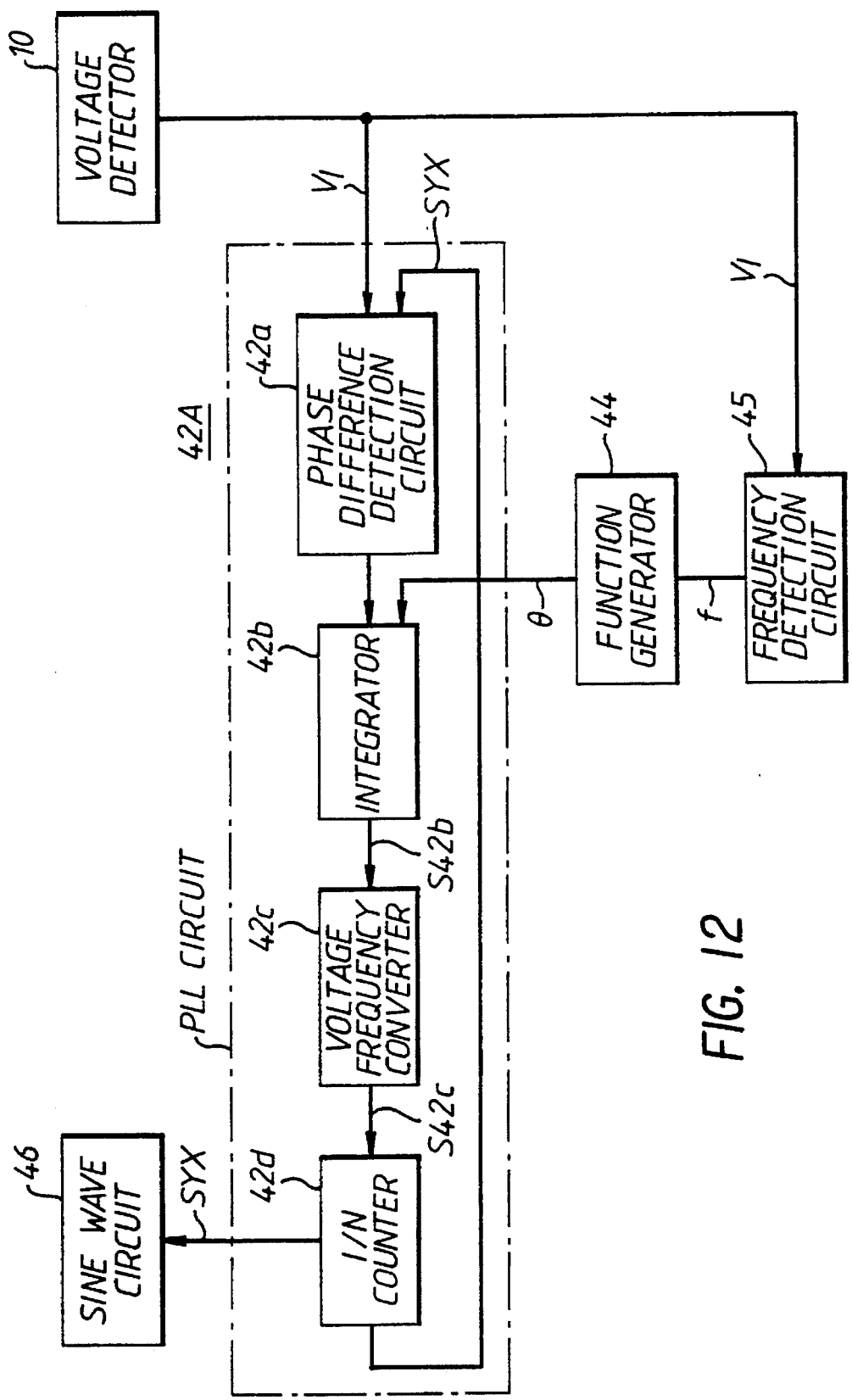
FIG. 12 is a block diagram showing another embodiment of this invention.

In one embodiment of this invention as shown in FIG. 12, the frequency detection circuit 45 is directly connected to the voltage detector 10 and detects the frequency f of the AC voltage $V_1$. The function generator 44 generates the signal Θ corresponding to the frequency f as in the embodiment of FIG. 7. The signal Θ is input to the integrator 42b in the PLL circuit 42A. The integrator 42b adds the signal e and the phase difference applied by the phase difference detection circuit 42a and performs the above-described integration based on the added result.

The output signal SYX of the PLL circuit 42A is then applied to the sine wave circuit 46 to change the phase of the output signal.

Figure 13:
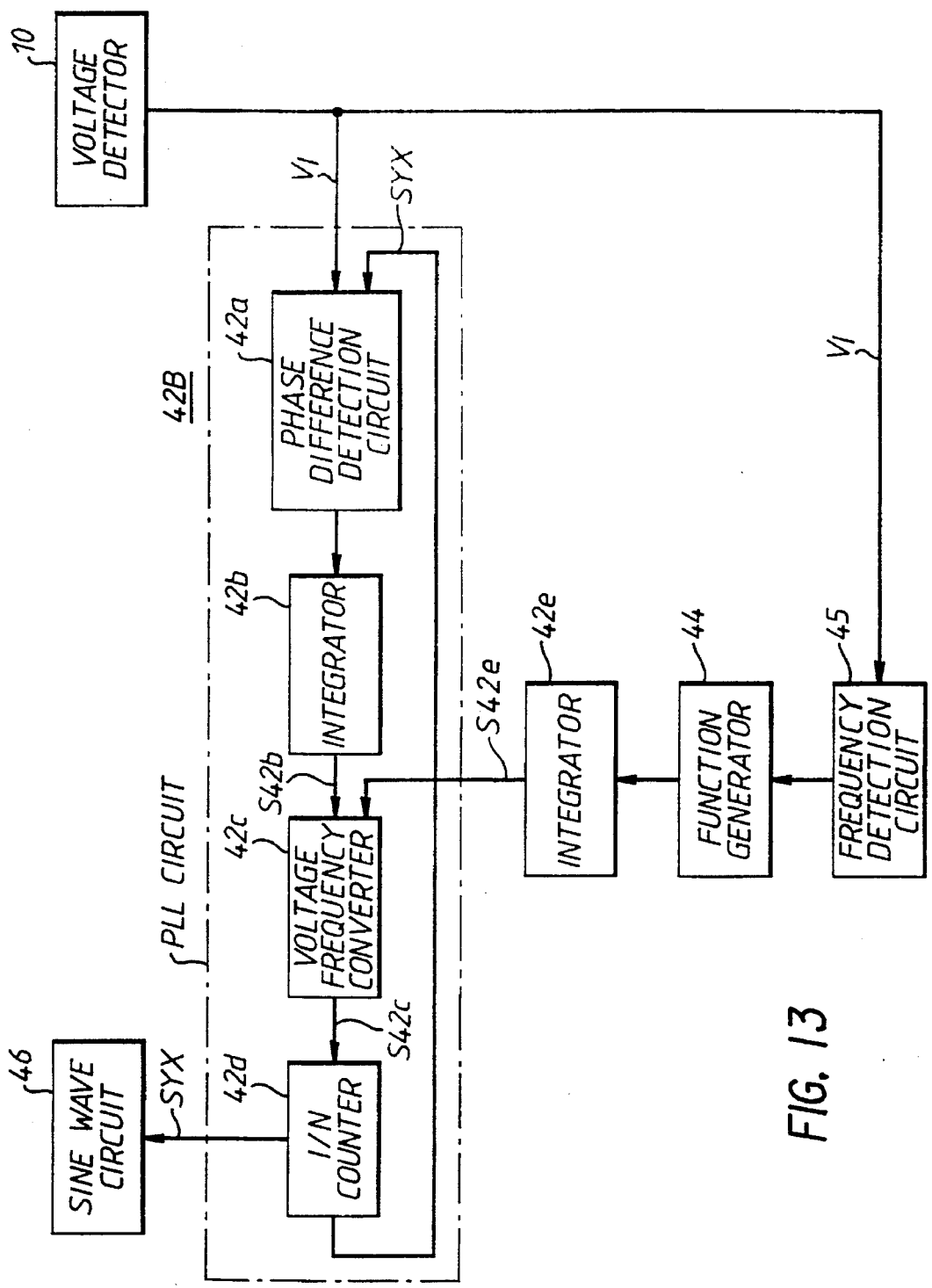
FIG. 13 is a block diagram showing another embodiment of this invention.

The embodiment of FIG. 12 can be changed into that shown in FIG. 13. In FIG. 13, an integrator 42e is provided between the function generator 44 and PLL circuit 42B. An output signal S42e of the integrator 42e is input to the voltage-frequency converter 42c, which generates the frequency S42c proportional to the added value of the signal S42b and the signal S42e. It is easily understood that the same action as in FIG. 12 can be performed in the embodiment shown in FIG. 13.

In the above-described embodiments, the PLL circuit 42, the phase shift circuit 43, the frequency detection circuit 45, the sine wave circuit 46 and the frequency change rate relay 47, and so on are well known to those skilled in the art. So, the detailed description of their circuit constructions may be omitted.

Moreover, it is easy to construct the function generator 44 for those skilled in the art based on the description of FIG. 8, so that the detailed description of its construction may also be omitted.

With the embodiments of this invention, if the frequency of the AC power source rises above the rated value, action is performed such that the current phase of the inverter 2 is advanced so as to further raise the frequency; if the frequency drops below the rated value, action is performed such as to delay the current phase of the inverter 2, thereby further lowering the frequency; thereby destroying the power balance. As a result, the inverter 2 is shut down in response to frequency or voltage abnormality, and an inverter protection device can thereby be provided wherein protection can be achieved by rapidly and reliably detecting islanding.

Still another embodiment of this invention is described below with reference to the drawings. This embodiment shows the details of the distortion detector 27 and the distortion change detector 33 and also another embodiment of an inverter protection device according to this invention.

Figure 14:
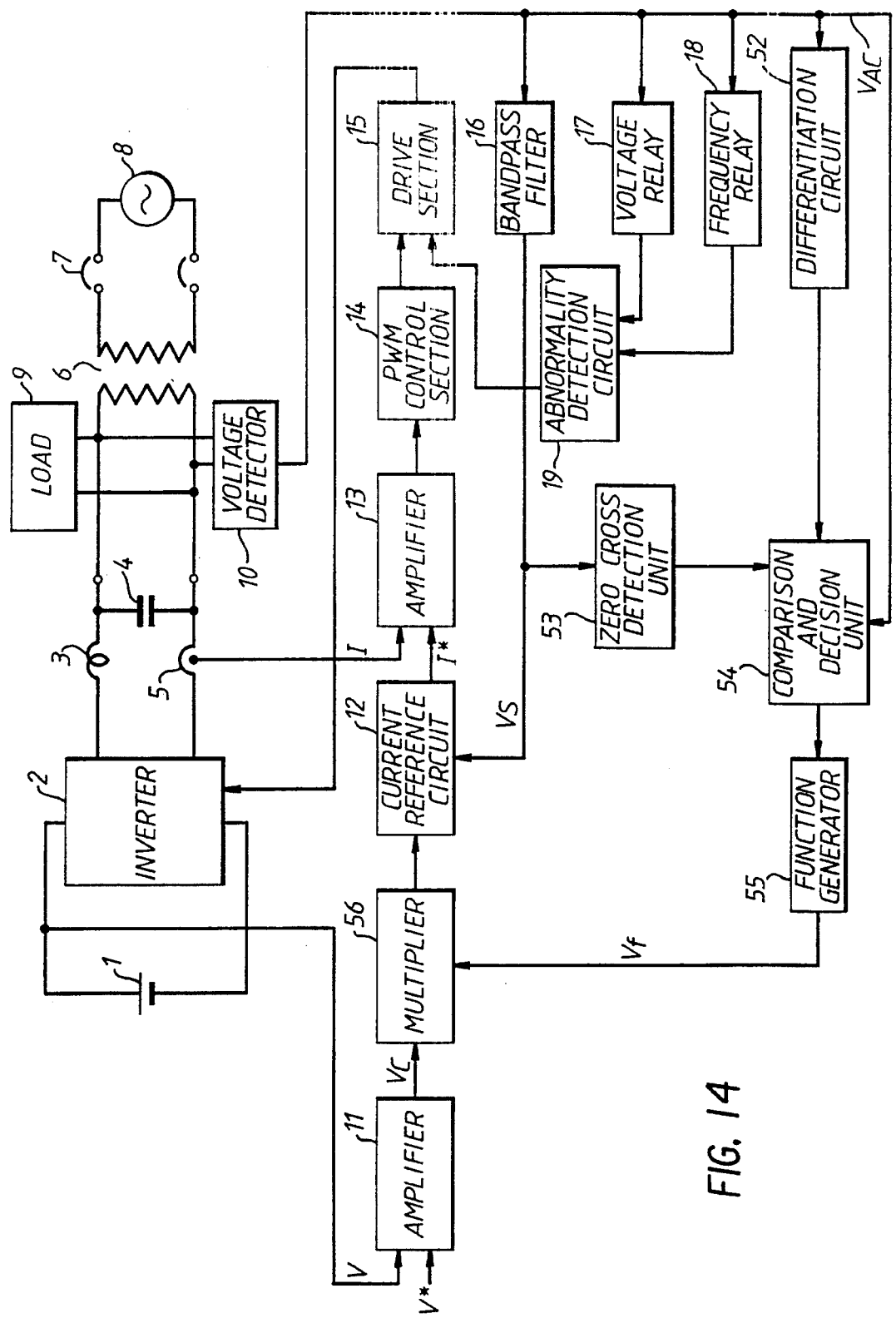
FIG. 14 is a block diagram showing an inverter protection device according to another embodiment of this invention.

Another embodiment of an inverter protection device according to this invention is shown in FIG. 14.

A differentiation circuit 52 detects the rate of change of voltage of the AC voltage of the load side that is detected by the voltage detector 10. A zero cross detection unit 53 detects the zero cross time point of the AC voltage of the load side from the output of the filter 16. A comparison and decision unit 54 detects the islanding condition from the AC voltage and the rate of change of the AC voltage on the load side at prescribed times before and after the zero cross time point. A function generator 55 outputs a time function signal Vf for changing the output power of the inverter 2 in response to an instruction from the comparison and decision unit 54. A multiplier 56 outputs the result of multiplying the output signal Vc of the amplifier 11 and the output signal Vf of the function generator 55. The current reference circuit 12 outputs the current reference I* obtained by multiplying the output of the multiplier 56 by the sine wave signal Vs that is output from the filter 16.

Let us consider the case when the circuit breaker 7 is opened in the above construction when the inverter output current of the load 9 is balanced.

The inverter output current is subject to current control with high power factor (power factor≈1) so that it delivers a sine wave current of the same phase as the AC voltage. So, with a load power factor of 1, when the load current is balanced with the inverter output current, even if the circuit breaker 7 is then opened, there is then scarcely any change in voltage or frequency of the AC voltage.

Figure 15A:
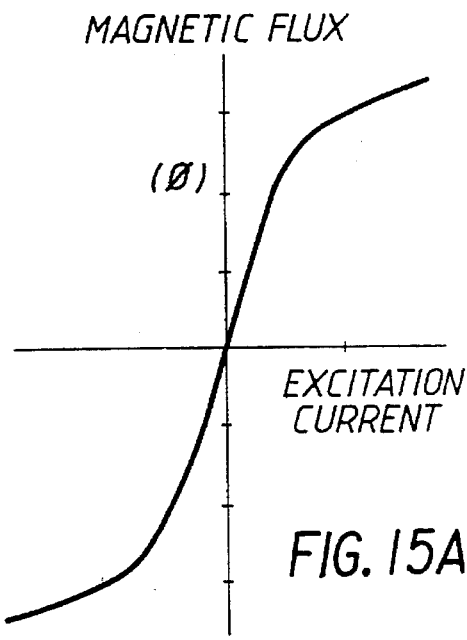
FIG. 15 is a waveform chart for describing the operation of a transformer 6 of FIG. 14.
Figure 15B:
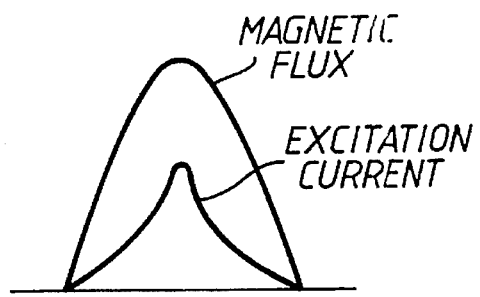
Figure 15C:
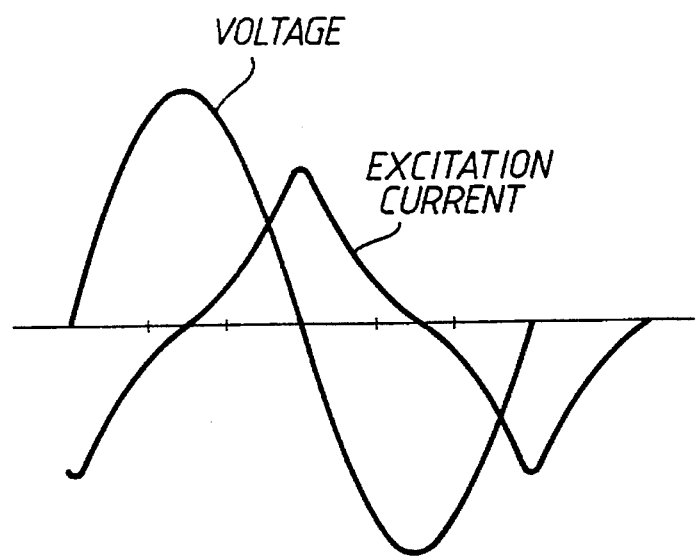

In the core characteristics of the transformer 6 (typically, a pole transformer), as shown in FIG. 15(*a*), magnetic flux φ is in non-linear relationship with the exciting current. In particular, a pole transformer is used with a fairly high magnetic flux density. So, as shown in FIG. 15(*b*), an exciting current with a high peak value different from a sine wave is employed in order to generate a sine wave magnetic flux.

Consequently, when a sine wave voltage is applied to the pole transformer 6, the relationship between the pole transformer voltage and exciting current is as shown in FIG. 15(*c*). Specifically, a large exciting current flows in the neighbourhood of the zero cross of the voltage.

When the circuit breaker 7 is open, it might be thought that the excitation current of transformer 6 would branch from the sine wave current of power factor 1 supplied from the inverter 2.

Figure 16A:
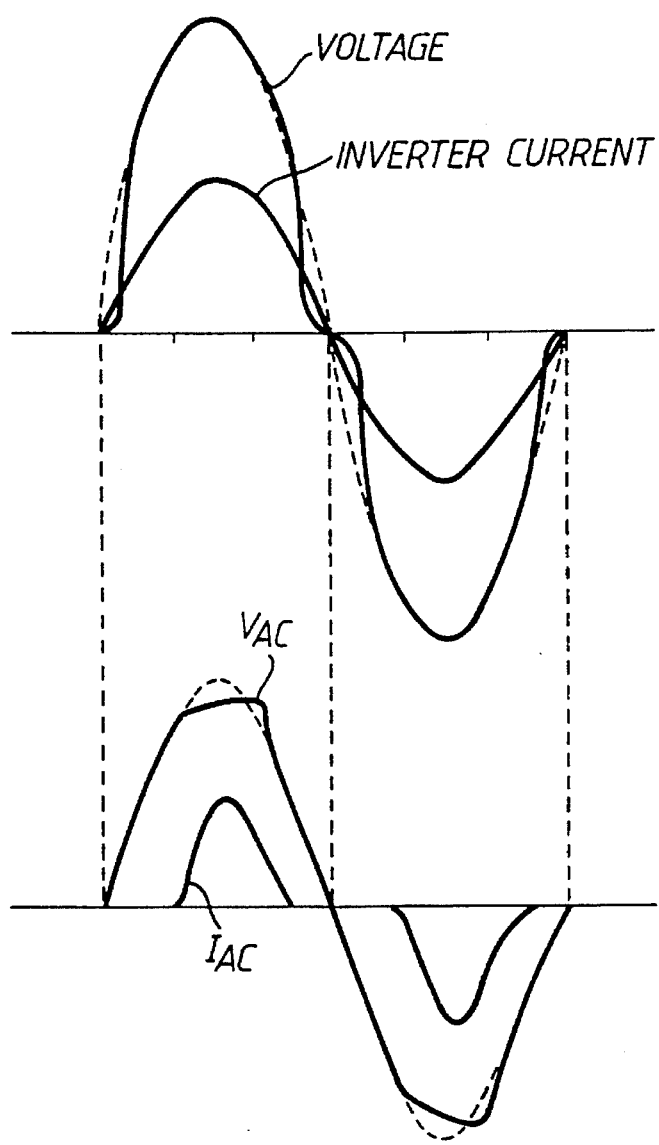
FIG. 16 is a view for describing the operation of the embodiment of FIG. 14.
Figure 16B:
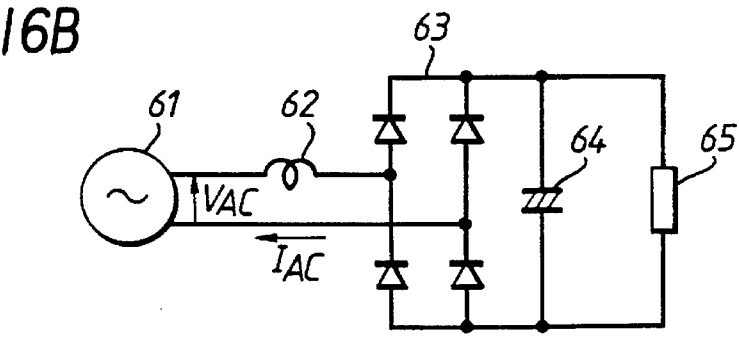

However, when the load power and inverter output power are in balance, as shown in FIG. 16(*a*), a sine wave current of power factor 1 is supplied, so, in the vicinity of zero cross, a sufficient exciting current as shown in FIG. 15(*c*) cannot be achieved. This therefore results in distortion of the voltage waveform. Specifically, in the vicinity of zero cross, the voltage is lower than a sine wave voltage. The comparison and decision circuit 54 identifies the islanding condition from the distortion of the voltage waveform in this zero cross vicinity.

Figure 17:
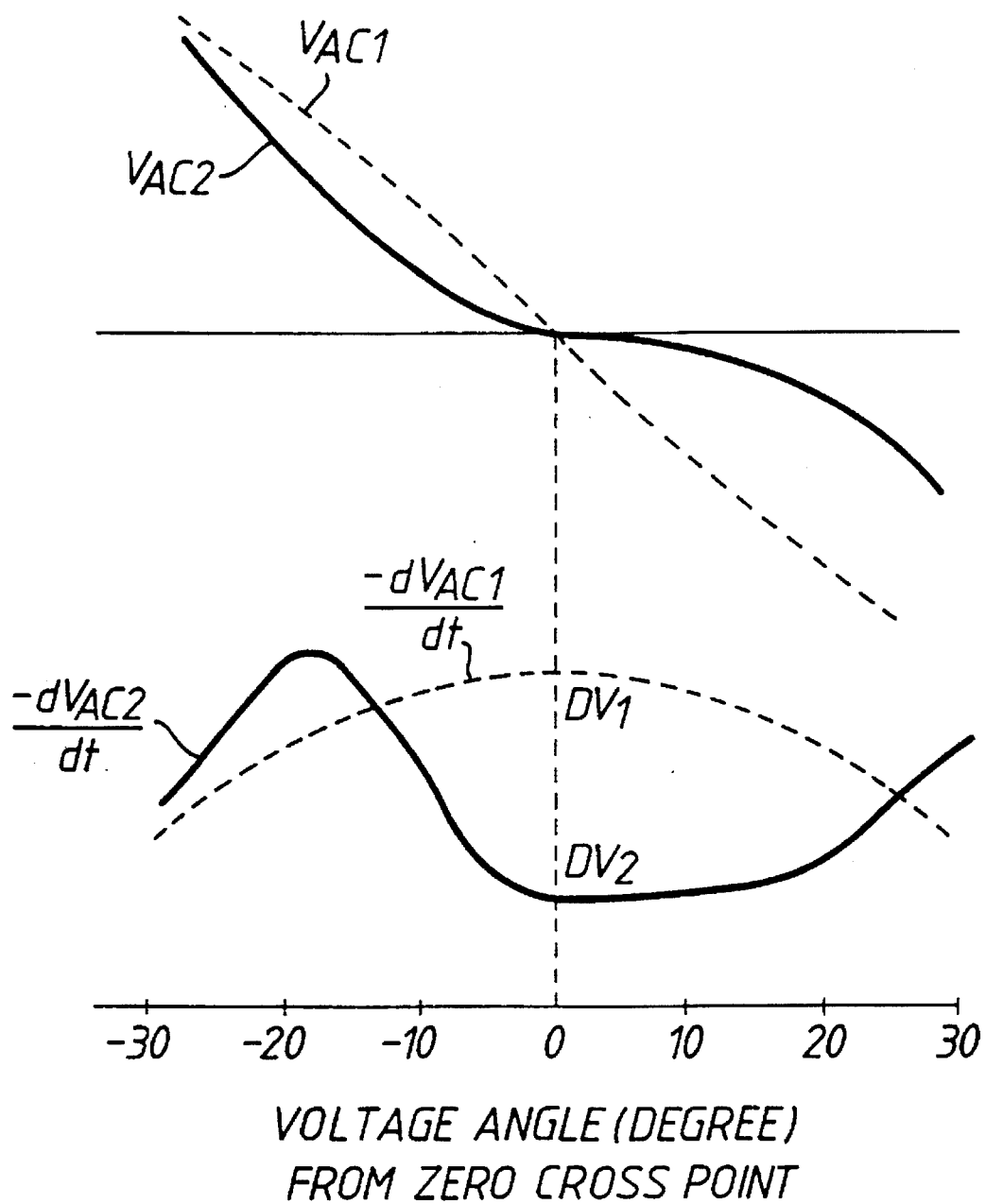
FIG. 17 is a waveform chart for describing operation of the embodiment of FIG. 14.

FIG. 17 shows the voltage rate of voltage change in the vicinity of zero cross. The broken line shows the case of a sine wave waveform when the circuit breaker 7 is closed, and the continuous line shows the case of the islanding condition when the circuit breaker 7 is open.

When the circuit breaker 7 is closed, sine wave voltage $V_{AC1}$ is supplied from the AC power system 8 and an exciting current as shown in FIG. 15(*c*) flows in the transformer 6.

When the islanding condition has been produced with the circuit breaker 7 open, as described above, the exciting current supplied from the inverter 2 is insufficient in the zero cross vicinity, so that the voltage in terms of its absolute value becomes lower than the sine wave voltage $V_{AC1}$, as shown by voltage $V_{AC2}$. In particular, the differentiated value of the voltage, i.e. the rate of voltage change, has a value which differs greatly from that of a sine wave, and islanding can thereby be easily detected. Specifically, by monitoring the rate of voltage change at the zero cross point ($dV_{AC2}/dt=DV2$), the islanding condition can be identified as when the difference (DV2−DV1) or the ratio (DV2/DV1) of the rate of voltage change ($dV_{AC1}/dt=DV1$) at the zero cross point for the case of a sine wave exceeds a prescribed value.

Figure 18:
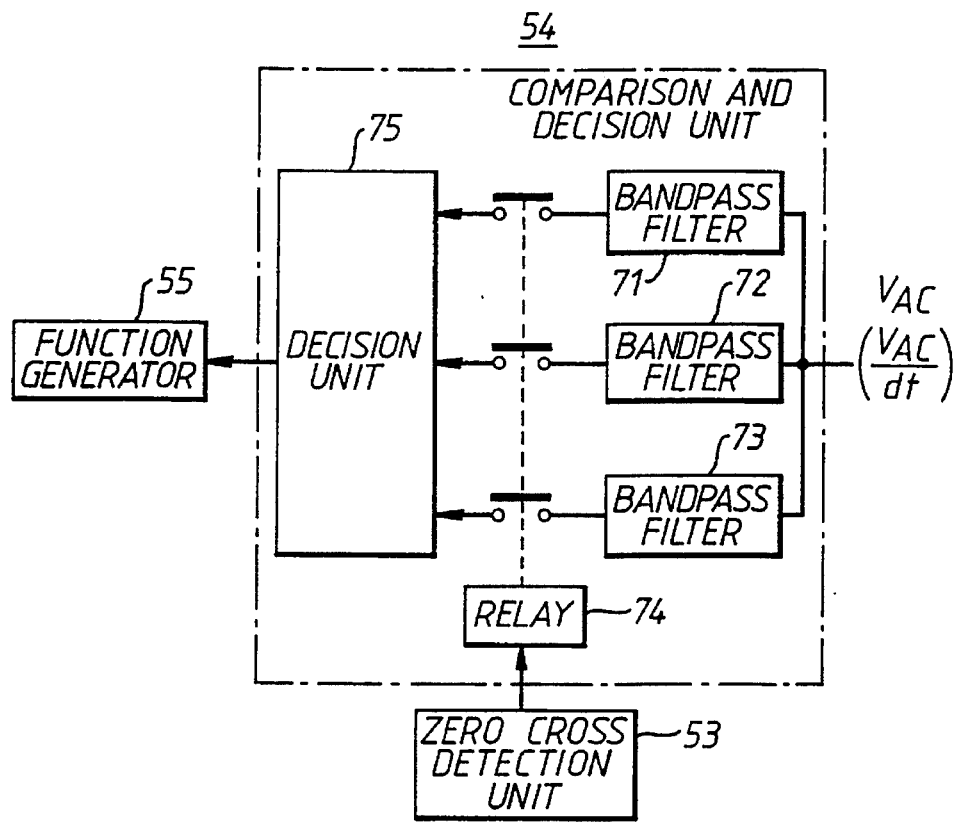
FIG. 18 is a block diagram showing another embodiment of this invention.

FIG. 18 shows a specific embodiment of the comparison and decision unit 54. In this embodiment, harmonic voltages such as third, fifth and seventh harmonics are detected by means of third, fifth and seventh band pass filters 71, 72 and 73 from the AC voltage $V_{AC}$ or its differentiated value $dV_{AC}/dt$, and the islanding condition is identified in a decision unit 75 from these harmonic voltages by actuating a relay 74 in the vicinity of the zero cross detected by the zero cross detection unit 53.

The comparison and decision circuit 54, when it detects the islanding condition, outputs a start-up instruction to the function generator 55. When function generator 55 receives this instruction, it changes signal Vf, which normally has a fixed value, to a timewise-varying signal (e.g. a signal that decreases with the passage of time, or a signal that oscillates slowly), which is output. This signal Vf is input to the multiplier 56, causing the current reference I* of the current reference circuit 12 to change, and thereby changing the output current of the inverter 2. As a result, the balance condition between the load power and inverter output power is destroyed, changing the voltage or frequency. This change is detected by the voltage relay 17 or the frequency relay 18, triggering the abnormality detection circuit 19 and stopping the operation of the inverter 2.

The function generator 55 can easily be constructed specifically by those skilled in the art based on the above description. Accordingly, the detailed description of the construction of the function generator 55 may be omitted.

With this embodiment, islanding can be reliably detected even in the case of a capacitor-input type load, such as inverter air conditioners or televisions. FIG. 16(*b*) shows a circuit construction of a typical example of a capacitor input type rectification load. In FIG. 16(*b*), an AC power is supplied from an AC power source 61 to a diode bridge circuit 63 through a capacitor for power factor improvement use. The diode bridge circuit 63 rectifies the AC power. The rectified power is smoothed by a capacitor 64 and is supplied to a load 65. In the case of such a capacitor input type load, a current $I_{AC}$ having a peak value in the vicinity of the maximum value of the AC voltage flows. And since impedance is present in the AC power source 61, waveform distortion as shown at $V_{AC}$ shown by the continuous line in FIG. 16(a) is produced, and a voltage waveform which contains a lot of harmonics is created. As the voltage waveform contains a lot of harmonics at normal time, it is difficult to detect an islanding condition by only monitoring the harmonics of the voltage. However, this has no effect in the vicinity of the zero cross, so, with this embodiment which monitors the waveform in the vicinity of zero cross point, islanding can be detected with a high reliability.

Also, with this embodiment, since the inverter will not be immediately shut down even if the comparison and decision unit 54 erroneously detects islanding for a short time, the sensitivity of detection of islanding can be set to a high level.

It should be noted that identification of islanding by the comparison and decision unit 54 could be achieved by finding the integrated value of the absolute value of the voltage difference between the voltage $V_{AC2}$ and the sine wave voltage $V_{AC1}$ in a prescribed range of electrical angle (e.g. a range of ±30°) before and after the zero cross point, the islanding condition being identified as when this integrated value exceeds a prescribed value. It is also possible to identify the islanding condition as being when the rate of voltage change ($dV_{AC2}/dt$) in the vicinity of zero cross is non-monotonic.

The embodiment of FIG. 14 is an embodiment in which the output power of the inverter 2 is made to fluctuate by means of the output signal of the function generator 55 when an islanding condition is detected.

However, it is also possible to generate phase fluctuation or frequency fluctuation of the sine wave signal that is input to the current reference circuit 12 and to shut down the inverter 2 in response to this when an islanding condition is detected.

Figure 19:
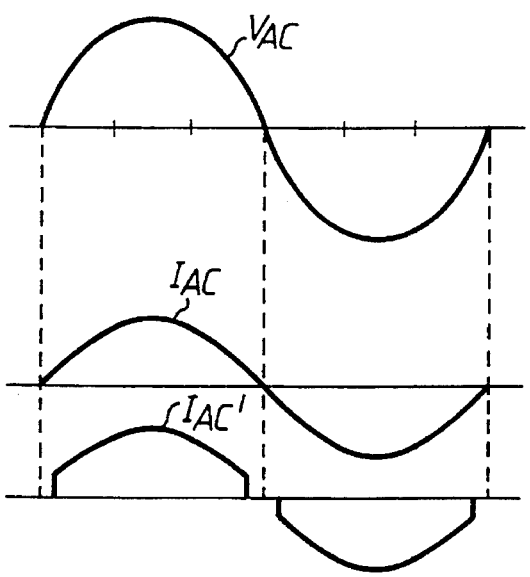
FIG. 19 is a waveform chart for describing operation of the embodiment of FIG. 14.

In this embodiment, there is provided a current control system that outputs a sine wave current at high power factor, and as shown in FIG. 19, control is effected such as to output AC voltage $V_{AC}$ and same-phase AC current $I_{AC}$. Current control can be performed so as to positively make zero the current in the vicinity of the zero cross of this AC current, as shown at $I_{AC}$, of FIG. 19. When an islanding condition is thereby produced, the voltage waveform in the vicinity of the zero cross is positively distorted so that the islanding condition can be reliably detected. If the detection of the islanding condition is reliable, a construction can be adopted wherein inverter operation is directly shut down by the output of the comparison and decision unit 54.

In the above description, an embodiment is disclosed in which the transformer 6 was connected on the AC output side of the inverter 2 and distortion was produced in the voltage waveform in the vicinity of the zero cross by the effect of its exciting current. However, if a circuit breaker is present in the secondary portion of transformer 6 and an islanding condition is produced by the opening of this circuit breaker, if the load 9 contains a lot of non-linear resistive load (capacitor input type rectification circuit load and/or core excitation winding load of a motor etc.), it is possible to identify the islanding condition in the same way as described above by detecting the distortion generated in the voltage waveform caused by the unbalance in the vicinity of the zero cross between the current that is dissipated in the load and the sine wave current that is supplied from the inverter 2.

According to this embodiment, the islanding condition is detected by noting the departure from a sine wave of the waveform in the vicinity of the zero cross of the AC voltage when an islanding condition is produced. Detection of the islanding condition can therefore be achieved with extremely high reliability without being affected by waveform distortion in the vicinity of the maximum value of the AC voltage. Also, an inverter protection device of high safety can be provided since the inverter 2 can be shut down on reliably detecting the islanding condition even in circumstances where a large number of inverters are operated in parallel.

In this embodiment, the case is described where the comparison and decision unit 54 outputs the start-up instruction to the function generator 55 when it detects islanding. But this invention is not limited to this embodiment. In the embodiment shown in FIG. 1, the comparison and decision unit 54 may be employed instead of the distortion detector 27 and the distortion change detector 33. When the comparison and decision unit 54 detects islanding, it causes the power balance to be broken through the coefficient setting circuit 30 and the phase/gain setting circuit 31.

Thereby, the frequency and the voltage are caused to fluctuate and the inverter 2 is stopped by operating the voltage relay 17 and the frequency relay 18.

A still further embodiment of an inverter protection device according to this invention is described with reference to the drawings.

Figure 20:
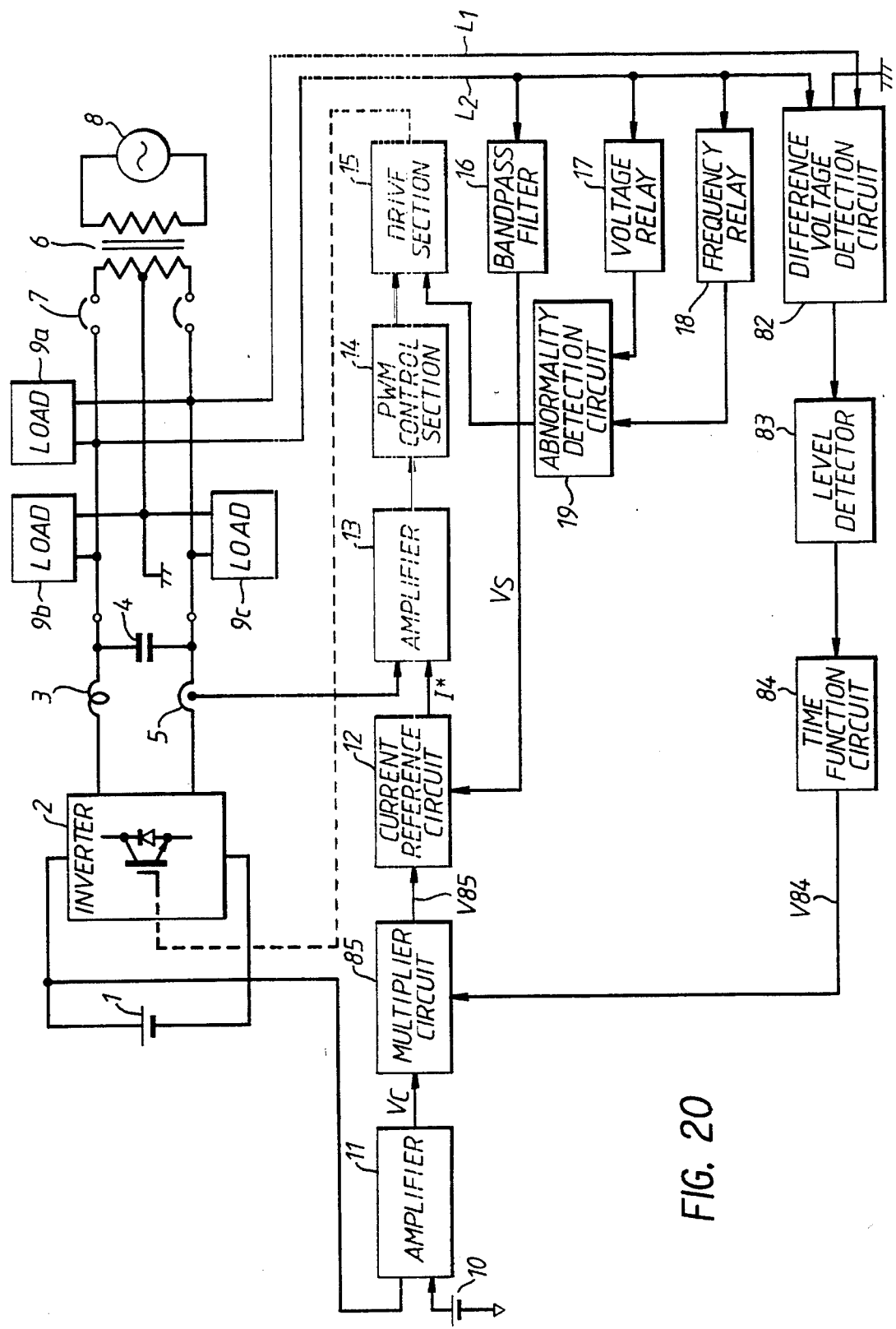
FIG. 20 is a block diagram showing an inverter protection device according to another embodiment of this invention.

The layout of this further embodiment of this invention is described in FIG. 20.

In FIG. 20, the AC power from the AC power system 8 is stepped down by the post transformer 6 and is supplied to ordinary domestic loads 9a, 9b and 9c through the circuit breaker 7. In this case, usually the voltage of AC 200 V (respective mid-points 100 V) is supplied to the loads 9a, 9b and 9c by a single-phase 3-wire system. Currently most loads are 100 V loads but more 200 V loads are tending to be used. The load 9a is connected between lines L1 and L2 (in general 200 V). The load 9b is connected between the line L2 and the mid-point (ground). The load 9c is connected between the line L1 and the mid-point (ground).

A difference voltage detection circuit 82 detects the voltage difference between the voltage between the line L1 and mid-point and the voltage between the line L2 and the mid-point.

A level detector 83 performs level detection and if the detected voltage difference gets above a set value it designates this as an abnormality and causes a time function circuit 84 to generate an output $V_{84}$. A multiplier circuit 85 multiplies the control signal Vc and the output $V_{24}$ to produce a value $V_{85}$. The current reference circuit 12 outputs the current reference I* obtained by multiplying the output $V_{85}$ of the multiplier circuit 85 by the sine wave signal $V_5$ that is output from the filter 16.

Let us consider the case where the circuit breaker 7 is opened when the resultant load of loads 9a, 9b, and 9c is in balance with the inverter output. The equivalent circuit of this case is shown in FIG. 21.

The inverter output current $i_{INV}$ of the current-controlled inverter 2 is controlled such as to give a sine wave (power factor 1) of the same phase as the AC voltage, and the inverter 2 is employed for system linkage in a system employing a solar cell.

Although it is very infrequent, it is possible for the situation to arise that the voltage and frequency of the AC power source (in this case the voltage of the load) may be practically unchanged if the circuit breaker 7 is opened while the load power factor is 1 and the load is in balance with the inverter output. Operation may therefore continue for a prolonged period. This is called islanding.

In FIG. 21, the probability that the load current seen from terminals A and B and the inverter output current are perfectly balanced is very small. Let us now assume that this probability is $10^{-4}$.

In this condition, let us assume that the voltage between the terminal A and mid-point 0 (voltage of load 9b) is $V_1$ and the voltage between the terminal B and mid-point 0 is $V_2$. When the circuit breaker 7 is closed, due to the action of transformer 6, $$V_1 \approx V_2,$$

but after the circuit breaker 7 is opened, the voltages $V_1$ ad $V_2$ are determined by the impedance of load 9b and load 9c, respectively.

Consequently, even in the case where on islanding a normal value of the voltage ($V_1+V_2$) is maintained, the probability that the voltage ($V_1-V_2$)=0 must include that the loads 9b and 9c are in balance, including reactive power, so this probability is extremely low.

Furthermore, in order to make $V_1-V_2=0$, the load impedances must coincide including harmonics. So, the probability of these conditions being satisfied may be considered as of the same order as or better than the probability of islanding being established.

This situation is illustrated in FIG. 22. This shows:

FIG. 22(a) shows a case where the load impedances coincide including harmonics and power factor.

FIG. 22(b) shows a case where only the load power factor is different.

FIG. 22(c) shows a case where only the load active power is different.

FIG. 22(d) shows a case where only the harmonic content is different (only the current waveform of the load is different).

An abnormality can be detected in that $V_1-V_2\approx0$ except in the case of FIG. 22(a).

If this method of detection is adopted, the probability that, on islanding, $$V_1-V_2\approx0$$

is of the order: $10^{-4} \times 10^{-4} = 10^{-8}$, which is a probability that need not be considered for practical purposes.

In FIG. 20, using this principle, the voltage difference ($V_1-V_2$) is found by the difference voltage detection circuit 82. If this value is greater than the level set by the level detector 83, the time function generating circuit 84 generates the signal $V_{84}$ that varies with time (e.g. it falls with time or executes slow oscillation). The multiplier circuit 85 multiplies the signal $V_{84}$ by the control signal Vc. Thus, by changing the current reference I* the inverter output is caused to change and the balance with the load is thereby lost. This produces rapid changes in the voltage and frequency of the distribution wiring. The result is that an abnormality is detected by the voltage relay 17 and/or the frequency relay 18, which consequently shuts down the inverter 2 through the abnormality detection circuit 19.

With this embodiment, detection of islanding can be reliably achieved. This method is very easy and economic but is very effective in that the probability of detection of islanding may be considered to be 1 for practical purposes.

In FIG. 20, a time-wise variation was applied to the inverter output current by the time function generation circuit 84 after the abnormality was found by the level detector 83. Apart from stepwise change or gradient change, this change could be the change involving introduction of fluctuation. If the same control system is adopted, even for a large number of inverters, their times of commencement of fluctuation will be the same, so all the inverters will be synchronized, eliminating the possibility that their effects could cancel.

It is also possible to make the inverter disconnect from the system by immediately shutting down the inverter 2 by the output of level detector 83.

The difference voltage detection circuit 82, the level detector 83, the time function generation circuit 84 and the multiplier circuit 85 in FIG. 20 could of course be implemented comparatively easily by using a microcomputer. The voltage difference between the voltages $V_1$ and $V_2$, their phase difference, and their harmonic contents can also be separately detected and compared. A microcomputer can also easily detect change in the characteristics of the difference voltage (magnitude, harmonic content, and phase).

Figure 23:
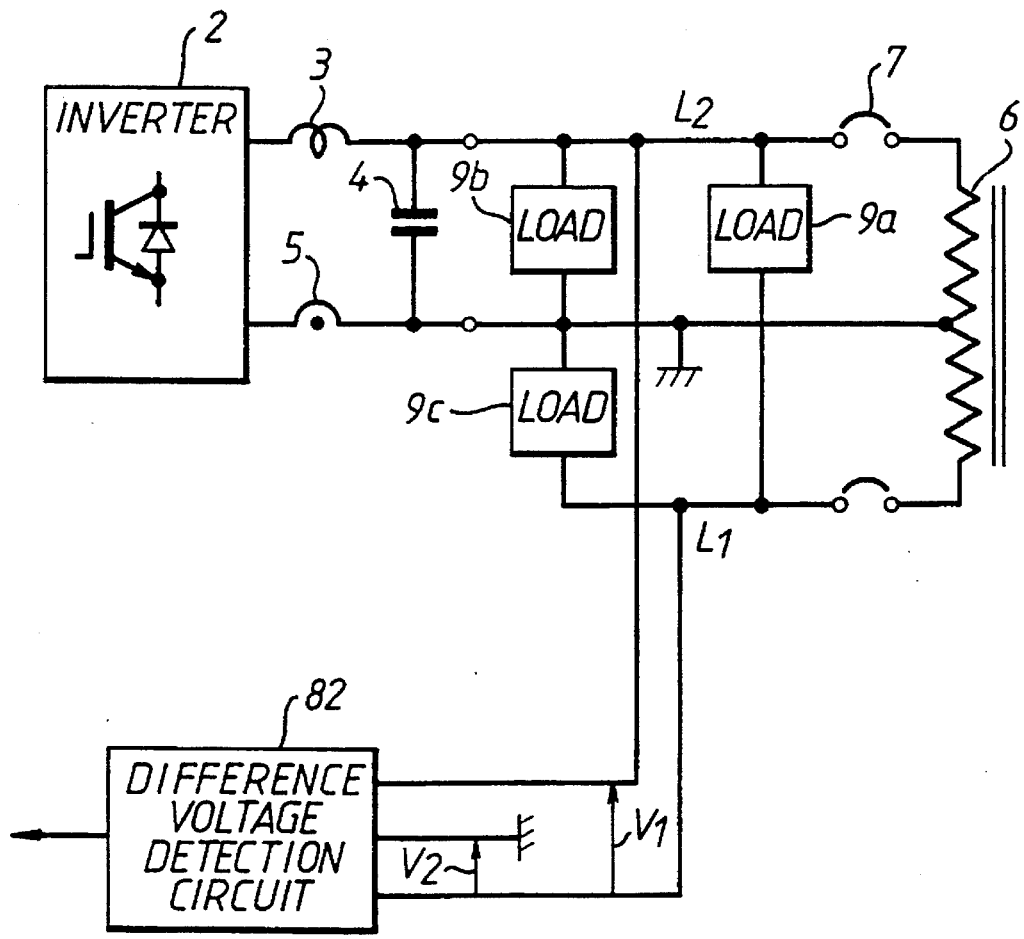
FIG. 23 is a block diagram showing a further embodiment of this invention.
Figure 24:
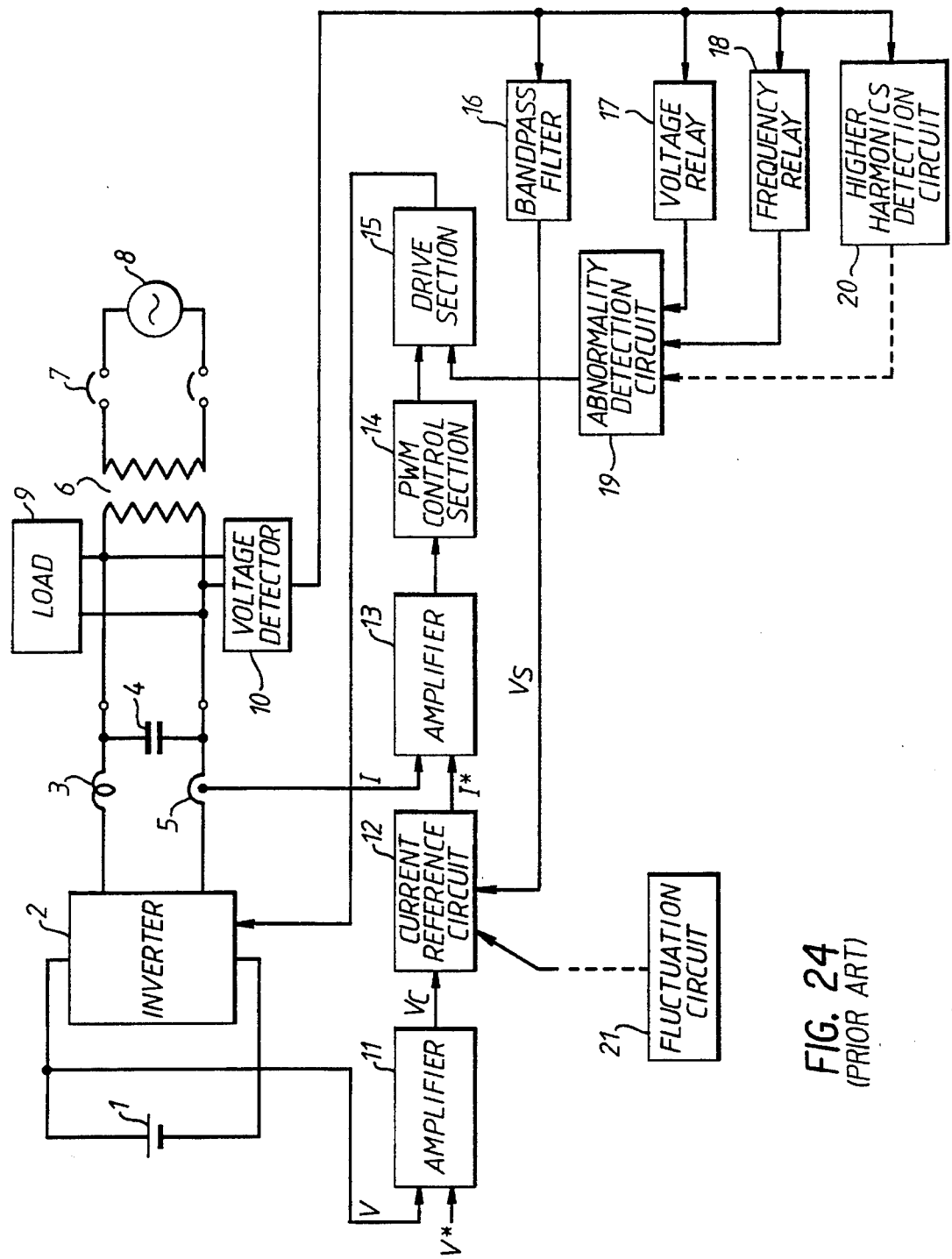
FIG. 24 is a block diagram showing an example of a conventional inverter protection device.
Figure 25A:
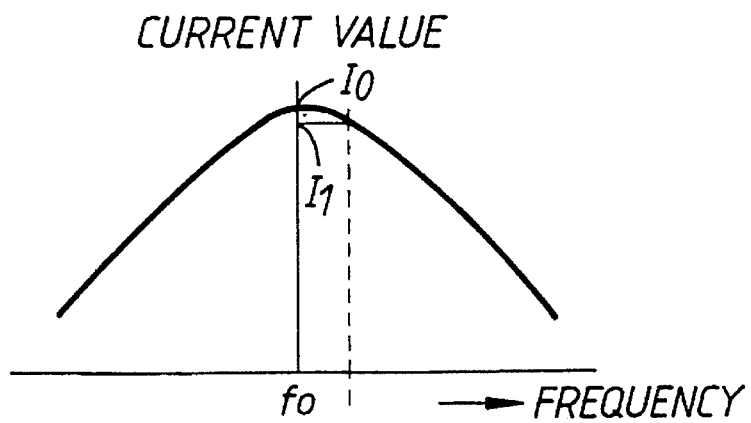
FIG. 25 is a waveform chart for describing the operation of the inverter protection device of FIG. 24.
Figure 25B:
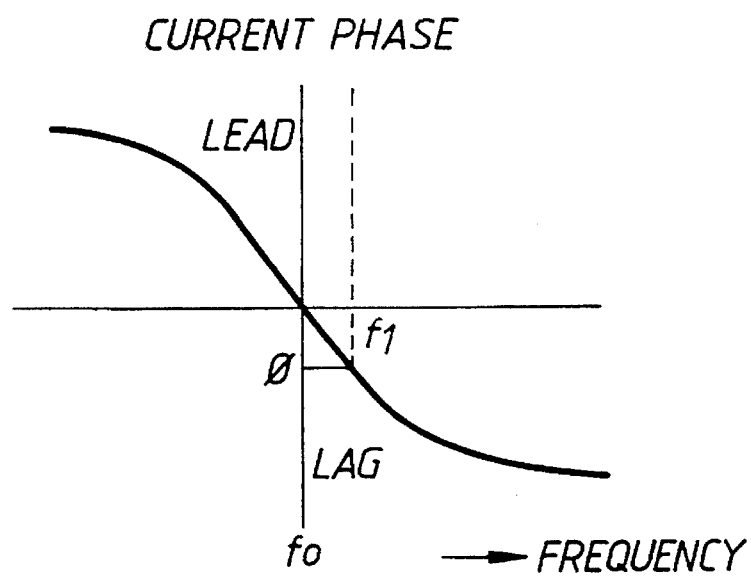

As shown in FIG. 23, if the inverter is connected between one wire and ground, specifically to a 100 V circuit, the value k ($=V_1-2V_2$) is found from the voltage across the other two wires to which the voltage relay 17 and/or the frequency relay 18 are not connected. It is of course possible to identify an abnormality as occurring when the value k exceeds a fixed value. It is also of course possible to use the same method if the transformer winding ratios are different, by taking into account this coefficient.

As described above, with this embodiment, an inverter protection device can be provided wherein the probability of detection of islanding is greatly improved by the addition of circuitry that detects the voltage difference between the voltages between wires other than the wires to which the inverter is connected, their phase difference and the difference of the their harmonics. Thus, when islanding occurs the inverter can be disconnected from the distribution system with high reliability such as to give rise to no problems at all in practice.

As described above, this invention can provide a protection device for an inverter which can detect islanding with good reliability.

Obviously, numerous modifications and variations of the present invention are possible in light of the above teachings. It is therefore to be understood that within the scope of the appended claims, the invention may be practiced otherwise than as specifically described herein.

What is claimed is:

1. A protection device for an inverter which is connected to an AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

a frequency detection circuit for detecting said frequency of said output voltage;

a frequency change ratio detection circuit for detecting a frequency change ratio of said output voltage;

a voltage instantaneous value detection circuit for detecting an instantaneous value of said output voltage;

a zero cross detection circuit for detecting a zero cross point when said output voltage crosses zero;

a distortion change detector connected to receive said instantaneous value and said zero cross point for detecting a distortion change of said output voltage in the vicinity of said zero cross point based on said instantaneous value;

a coefficient setting circuit connected to receive said frequency, said frequency change ratio and said distortion change for generating a phase coefficient value based on said frequency, said frequency change ratio and said distortion change;

a setting circuit connected to said phase coefficient value for generating a phase correction signal as said correction signal so as to shift said phase of said output voltage in a direction to diverse said frequency of said output voltage thereby to break a power balance between an output power of said inverter and a power consumed by said load;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

2. The protection device according to claim 1, further comprising:

a voltage effective value calculation circuit connected to receive said instantaneous value of said output voltage for generating an effective value of said output voltage based on said instantaneous value; and a change ratio detection circuit connected to receive said effective value and said current reference for detecting a change ratio of said effective value of said output voltage to said current reference;

wherein said coefficient setting circuit is further connected to receive said change ratio from said change ratio detection circuit and further generates a gain coefficient value based on said frequency, said frequency change ratio, said distortion change and said change ratio; and wherein said setting circuit is further connected to receive said gain coefficient value for generating a gain correction signal to set a gain to determine a magnitude of said current reference such that said gain is lowered based on a deviation of said gain coefficient value from a rated value, and generates said correction signal including said phase correction signal and said gain correction signal.

3. A protection device for an inverter which is connected to an AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

a phase locked loop circuit for generating a synchronized signal which is synchronized with said output voltage;

a frequency detection circuit connected to receive said synchronized signal for detecting said frequency of said output voltage;

a function generator connected to receive said frequency from said frequency detection circuit for generating a phase correction signal to break a power balance between an output power of said inverter and a power consumed by said load;

a phase shift circuit connected to receive said synchronized signal and said phase correction signal for shifting a phase of said synchronized signal by said phase correction signal to generating a correction signal;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

4. A protection device for an inverter which is connected to an AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

a zero cross detection circuit for detecting a zero cross point when said output voltage crosses zero;

a differentiation circuit connected to said zero cross detection circuit for detecting a change rate of said output voltage with respect to time;

a comparison and decision circuit connected to receive said zero cross point and said change rate for generating a signal when said change rate in the vicinity of said zero cross point exceeds a prescribed value;

a function generator connected to receive said signal from said comparison and decision circuit for generating a correction signal to break a power balance between an output power of said inverter and a power consumed by said load;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

5. A protection device for an inverter which is connected to a single-phase three-wire AC power system through a circuit breaker, converts DC power into AC power, supplies said AC power to loads and includes control means for detecting a phase and a frequency of an output voltage of said inverter, for generating a current reference synchronized with said output voltage and for controlling said inverter such that an output current of said inverter is coincident with said current reference, said protection device comprising:

a difference voltage detection circuit for detecting a first voltage between a first wire and a mid-point and a second voltage between a second wire and said mid-point and for detecting a voltage difference between said first voltage and said second voltage;

a level detector connected to receive said voltage difference for generating a signal when said voltage difference exceeds a prescribed value;

a function generator connected to receive said signal from said level detector for generating a correction signal to break a power balance between an output power of said inverter and a power consumed by said loads;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

6. A protection device for an inverter which is connected to an AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

first detection means for detecting that an AC output of said inverter is disconnected from said AC power system based on an electrical quantity including at least one of said frequency of the output voltage, a change ratio of said frequency and a distortion change ratio of said output voltage and for generating a detection signal based on a detection result;

correction means connected to receive said detection signal for generating a correction signal so as to shift said phase of said output voltage in a direction to diverge said frequency of said output voltage thereby to break a power balance between an output power of said inverter and a power consumed by said load;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

7. A protection device according to claim 6, wherein:

said correction means generates said correction signal so as to shift said phase of said output voltage in an opposite direction to diverge said frequency when said frequency deviates from a rated frequency by a set value.

8. A protection device for an inverter which is connected to an AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

first detection means for detecting that an AC output of said inverter is disconnected from said AC power system based on an electrical quantity including at least one of said frequency of said output voltage, a change ratio of said frequency, a distortion change ratio of said output voltage and a change ratio of an effective value of said output voltage to said current reference and for generating a detection signal based on a detection result;

correction means including,
a coefficient setting circuit connected to receive said detection result and for generating a gain coefficient value based on at least one of said frequency of said output voltage, said change ratio of said frequency, said distortion change ratio of said output voltage and said change ratio of said effective value of said output voltage to said current reference and a phase coefficient value based on at least one of said frequency of said output voltage, said change ratio of said frequency and said distortion change ratio of said output voltage, and a gain/phase setting circuit connected to receive said gain and phase coefficient values, for setting a gain based on said gain coefficient value to determine a magnitude of said current reference such that said gain is lowered based on a deviation of said first coefficient value from a rated value and setting said phase based on said phase coefficient value so as to shift said phase of said output voltage in a direction to diverge said frequency of said output voltage and for generating a correction signal based on said gain and phase thus set, thereby to break a power balance between an output power of said inverter and a power consumed by said load;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

9. A protection device for an inverter which is connected to an AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

first detection means for detecting that an AC output of said inverter is disconnected from said AC power system based on an electrical quantity of said output voltage including said frequency of said output voltage and for generating a detection signal based on a detection result;

correction means connected to receive said detection signal for generating a correction signal so as to shift said phase of said output voltage in a direction to diverge said frequency of said output voltage thereby to break a power balance between an output power of said inverter and a power consumed by said load such that said phase is advanced when said frequency is increasing and said phase is lagged when said frequency is decreasing;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

10. A protection device according to claim 9, wherein:

said correction means generates said correction signal so as to shift said phase of said output voltage such that a change ratio of said phase to said frequency is changed.

11. A protection device for an inverter which is connected to an AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

first detection means for detecting that an AC output of said inverter is disconnected from said AC power system based on a voltage waveform of said output voltage and for generating a detection signal based on a detection result when a distortion of said voltage waveform in the vicinity of a zero cross point of said output voltage exceeds a prescribed value;

correction means connected to receive said detection signal for generating a correction signal so as to shift said phase of said output voltage in a direction to diverge said frequency of said output voltage thereby to break a power balance between an output power of said inverter and a power consumed by said load;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

12. A protection device for an inverter which is connected to a single-phase three-wire AC power system through a circuit breaker, converts DC power into AC power, supplies said AC power to a load and includes control means for detecting a phase and a frequency of an output voltage of said inverter, for generating a current reference synchronized with said output voltage and for controlling said inverter such that an output current of said inverter is coincident with said current reference, said protection device comprising:

first detection means for detecting that an AC output of said inverter is disconnected from said AC power system based on two voltage between two wires of said three-wire as an electrical quantity of said output voltage and for generating a detection signal based on a detection result when a difference between said two voltages exceeds a prescribed value;

correction means connected to receive said detection signal for generating a correction signal so as to shift said phase of said output voltage in a direction to diverge said frequency of said output voltage thereby to break a power balance between an output power of said inverter and a power consumed by said load;

said control means being connected to receive said correction signal for correcting said current reference by said correction signal and for controlling said inverter based on said current reference thus corrected thereby to break said power balance; and second detection means for detecting that said power balance is broken and for generating an abnormality signal to stop operation of said inverter based on a detection result.

13. A protection device according to claim 12, wherein:

said first detection means detects that said AC output of said inverter is disconnected from said AC power system based on a first voltage between a first wire and a mid-point and a second voltage between a second wire and said mid-point as said two voltages, and generates said detection signal when a difference of at least one of a voltage, a phase and a waveform between said first and second voltage exceeds a prescribed value.

* * * * *